United States Patent [19]

Ontsuga et al.

[11] 4,368,091
[45] Jan. 11, 1983

[54] METHOD FOR PROVIDING THE INNER SURFACE OF A PIPE WITH A FLEXIBLE TUBULAR LINING MATERIAL THROUGH A LIQUID RESIN UNDER PRESSURE

[75] Inventors: Hisao Ontsuga, Tokyo; Akio Morinaga, Fujisawa; Akira Morita, Osaka, all of Japan

[73] Assignees: Tokyo Gas Co. Ltd., Tokyo; Ashimori Industry Co., Ltd., Osaka, both of Japan

[21] Appl. No.: 107,870

[22] Filed: Dec. 28, 1979

[30] Foreign Application Priority Data

Dec. 29, 1978 [JP] Japan .................................. 53-162093
Sep. 20, 1979 [JP] Japan .................................. 54-121415

[51] Int. Cl.³ .......................................... B29C 17/07
[52] U.S. Cl. ..................................... 156/287; 118/215; 118/254; 156/294; 156/423; 156/497; 156/578; 264/269; 264/516; 427/230; 427/235
[58] Field of Search .......................... 156/285–287, 156/288, 294, 231, 238, 246, 344, 423, 497, 578; 118/215, 254, 257; 264/269, 514, 516; 427/230, 235

[56] References Cited

U.S. PATENT DOCUMENTS

| 1,721,838 | 7/1929 | Semon et al. | 156/287 |
|---|---|---|---|
| 2,794,758 | 6/1956 | Harper et al. | 156/287 |
| 3,132,062 | 5/1964 | Lang et al. | 156/294 |
| 3,230,129 | 1/1966 | Kelly | 156/287 |
| 3,494,813 | 2/1970 | Lawrence | 156/287 |
| 3,560,295 | 2/1971 | Kimbrell et al. | 156/287 |
| 4,064,211 | 12/1977 | Wood | 156/287 |
| 4,135,958 | 1/1979 | Wood | 156/287 |
| 4,182,262 | 1/1980 | Everson et al. | 156/294 |

FOREIGN PATENT DOCUMENTS

| 475828 | 7/1974 | Australia | 156/294 |
|---|---|---|---|
| 1512035 | 5/1978 | United Kingdom | 156/294 |

*Primary Examiner*—Jerome W. Massie
*Attorney, Agent, or Firm*—Birch, Stewart, Kolasch & Birch

[57] ABSTRACT

A method and apparatus for providing the inner surface of a pipe with a flexible tubular lining material through a liquid resin under pressure which comprises fixing one end of a flexible tubular lining material in such manner that the flexible tubular lining material is turned inside out at the fixed end to an annular fastener of a connecting assembly connected in the front thereof to a pipe to be treated and thereafter applying fluid pressure to the annular fastener from the rear of the assembly to push the tubular lining material forward within the pipe while effecting evagination of the tubular lining material at the same time at the top of the proceeding tubular lining material thereby attaching the inner surface of the tubular lining material exposed by evagination under pressure tightly to the inner surface of the pipe, characterized by previously forming a reservoir of the liquid resin enclosed in the interior of the unevaginated portion of the tubular lining material positioned in the rear of the annular fastener, applying the liquid resin onto the inner surface of the tubular lining material passing through the reservoir while applying external fluid pressure to the portion of the tubular lining material where the reservoir is formed, squeezing the tubular lining material externally to adjust the quantity of the liquid resin applied onto the inner surface thereof and thereafter attaching the liquid resin-applied inner surface of the tubular lining material onto the inner surface of the pipe under pressure to form a flexible lining on the inner surface of the pipe with the liquid resin being interposed therebetween. This method is advantageously utilized for preventing leakage of various kinds of gas and liquid from pipes caused by the formation of cracks and/or pinholes therein as well as electric leakage caused by intrusion of water through cracks and/or pinholes formed in a casing or pipe enclosing electric wires.

13 Claims, 32 Drawing Figures

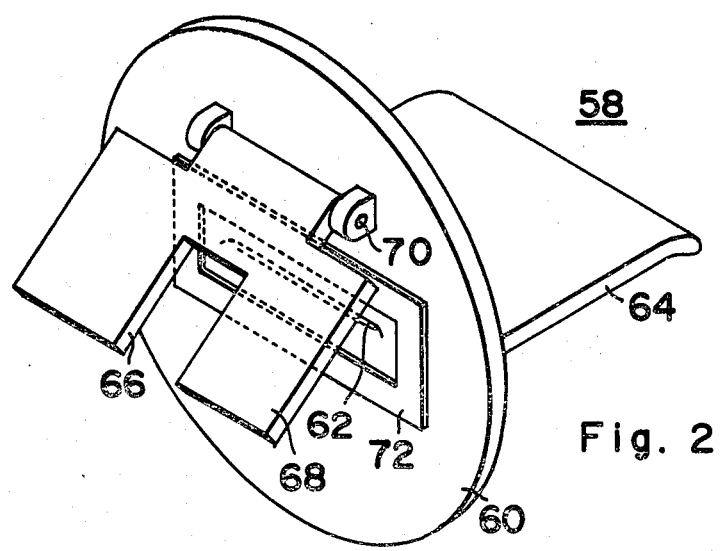
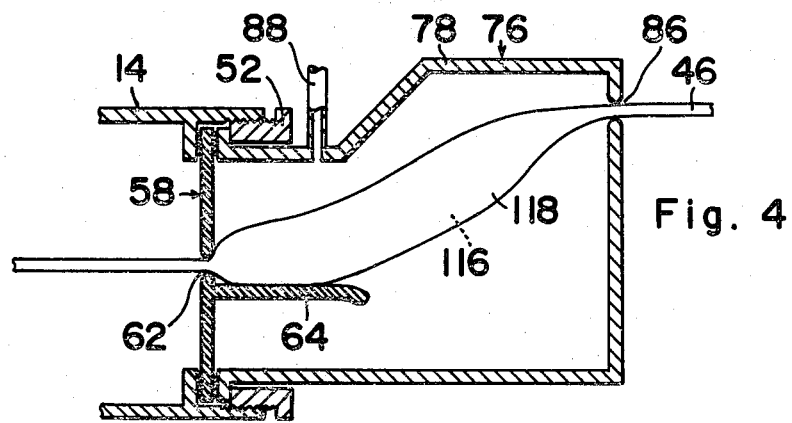
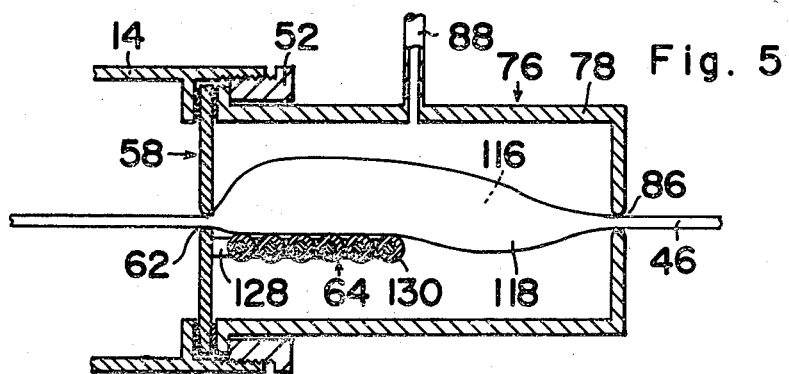

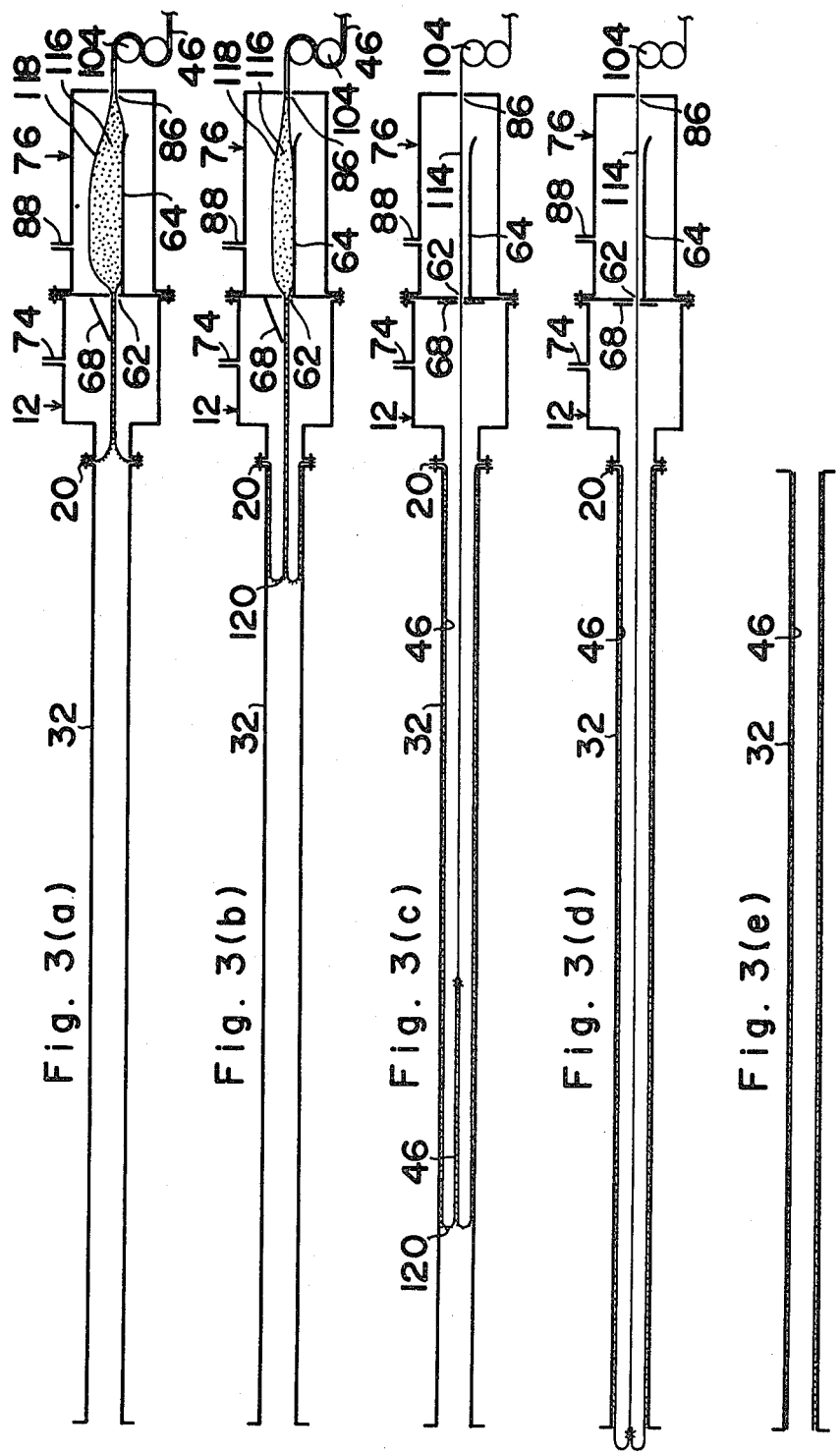

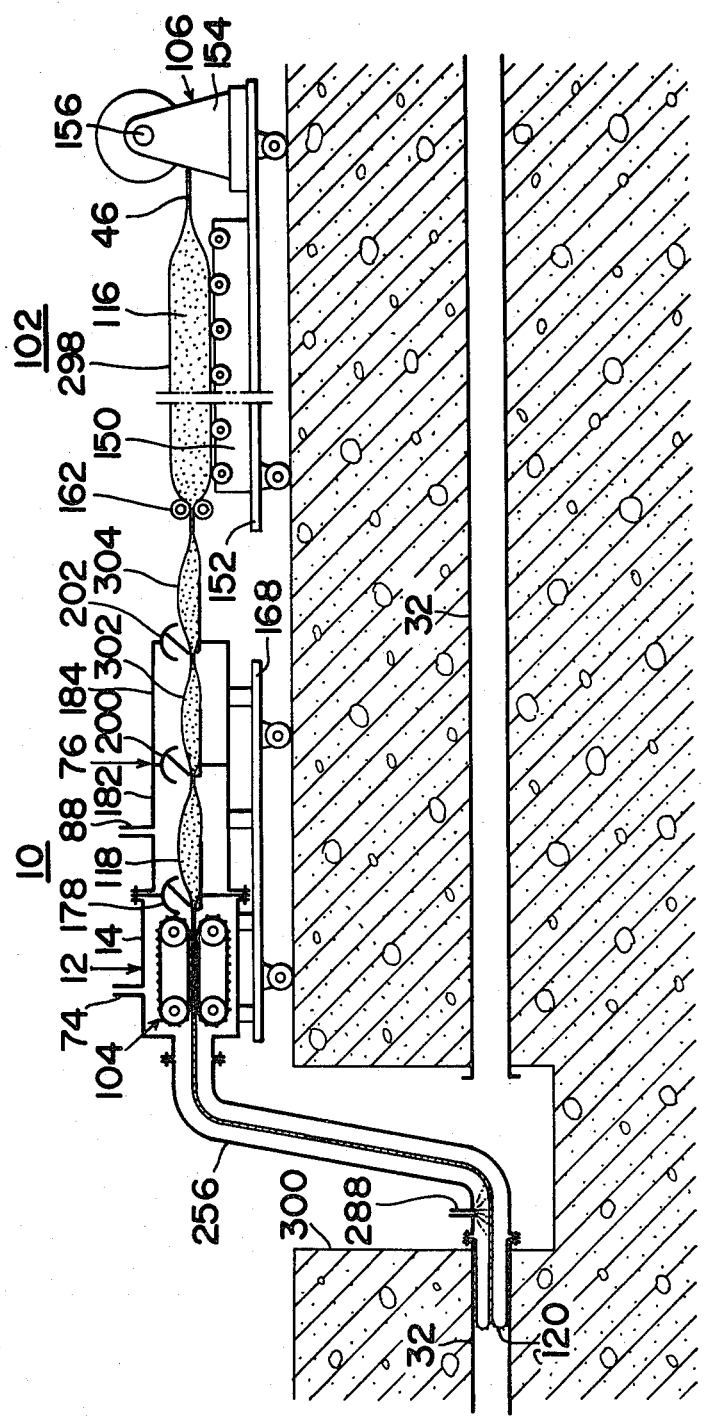

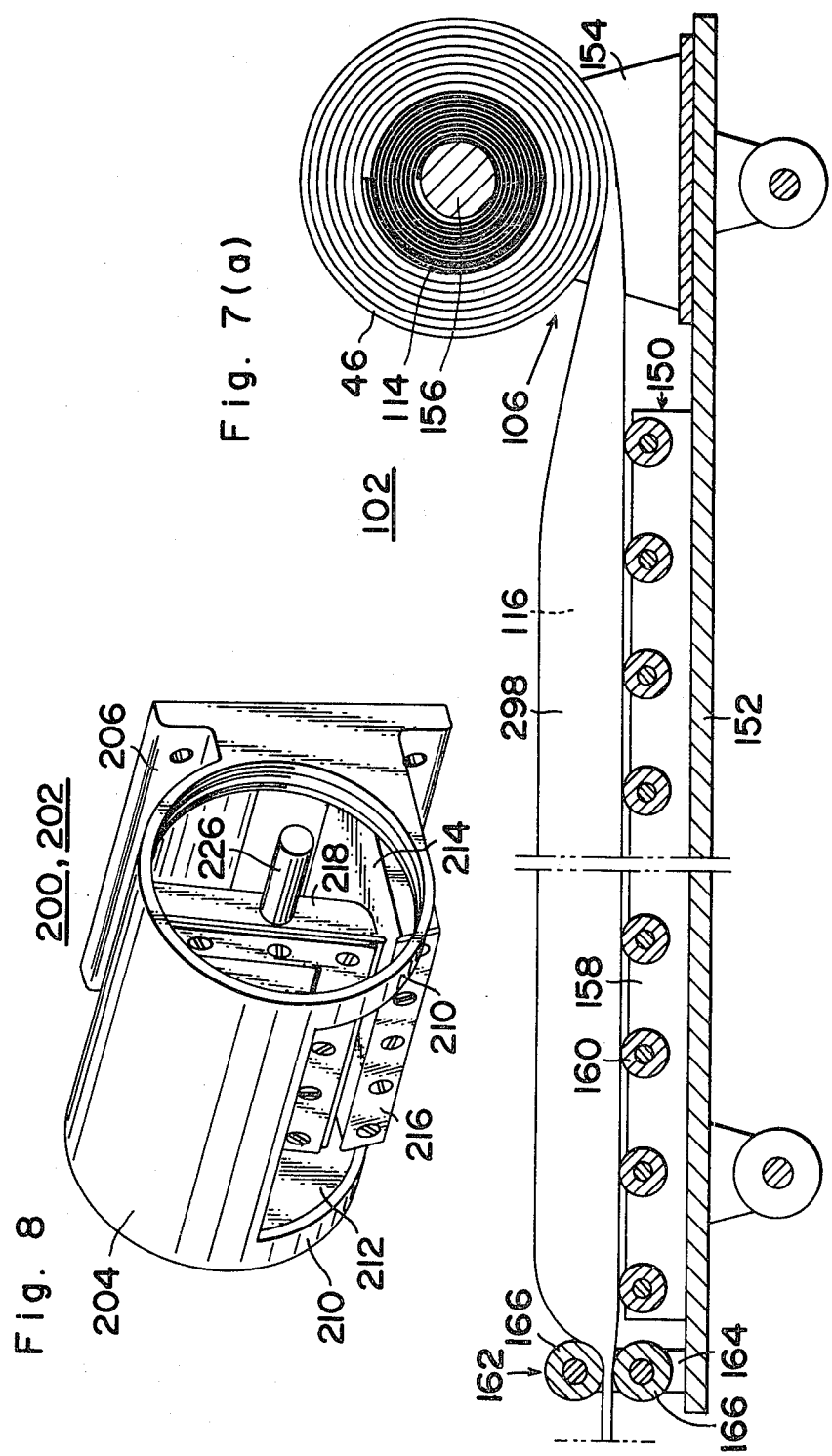

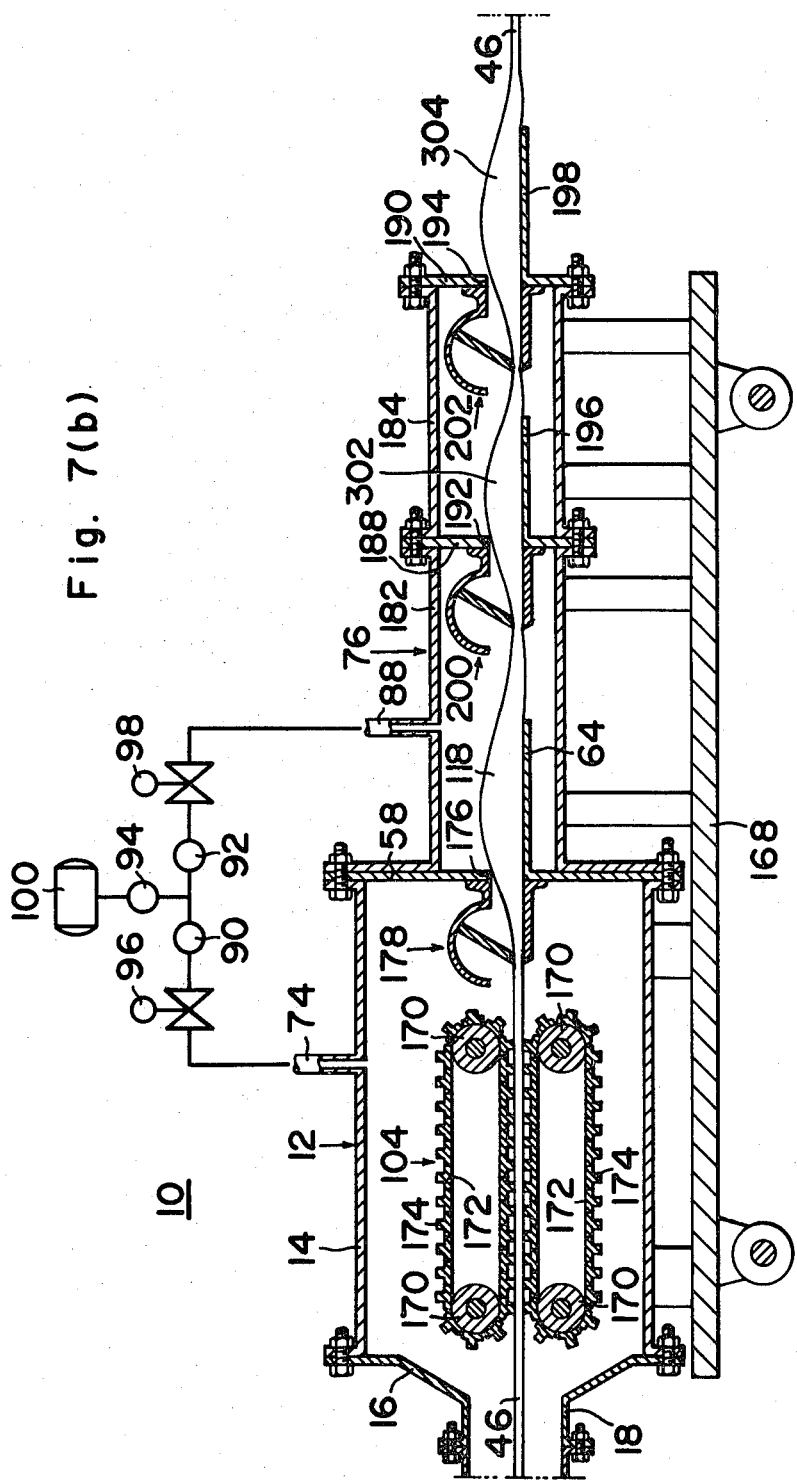

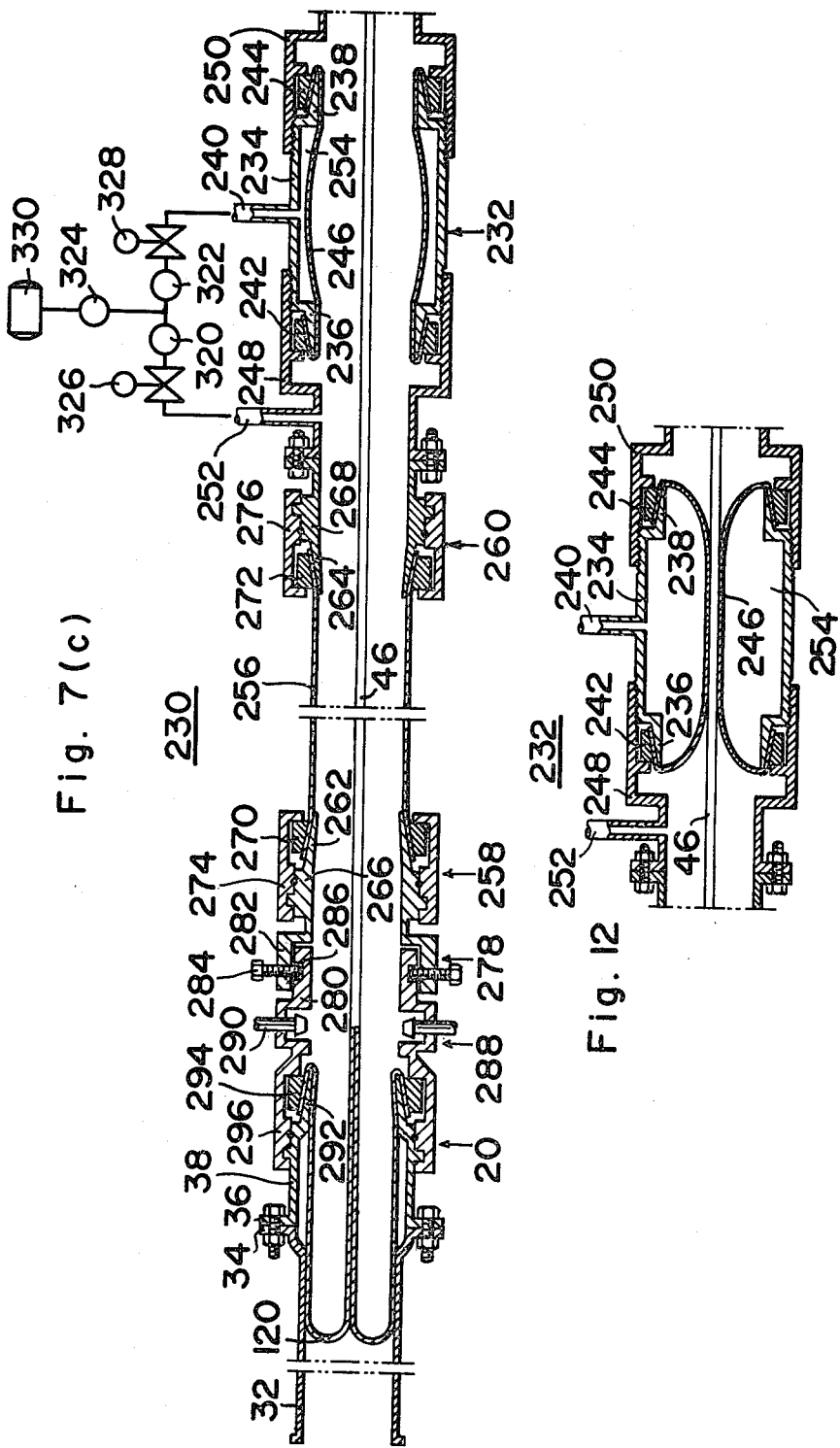

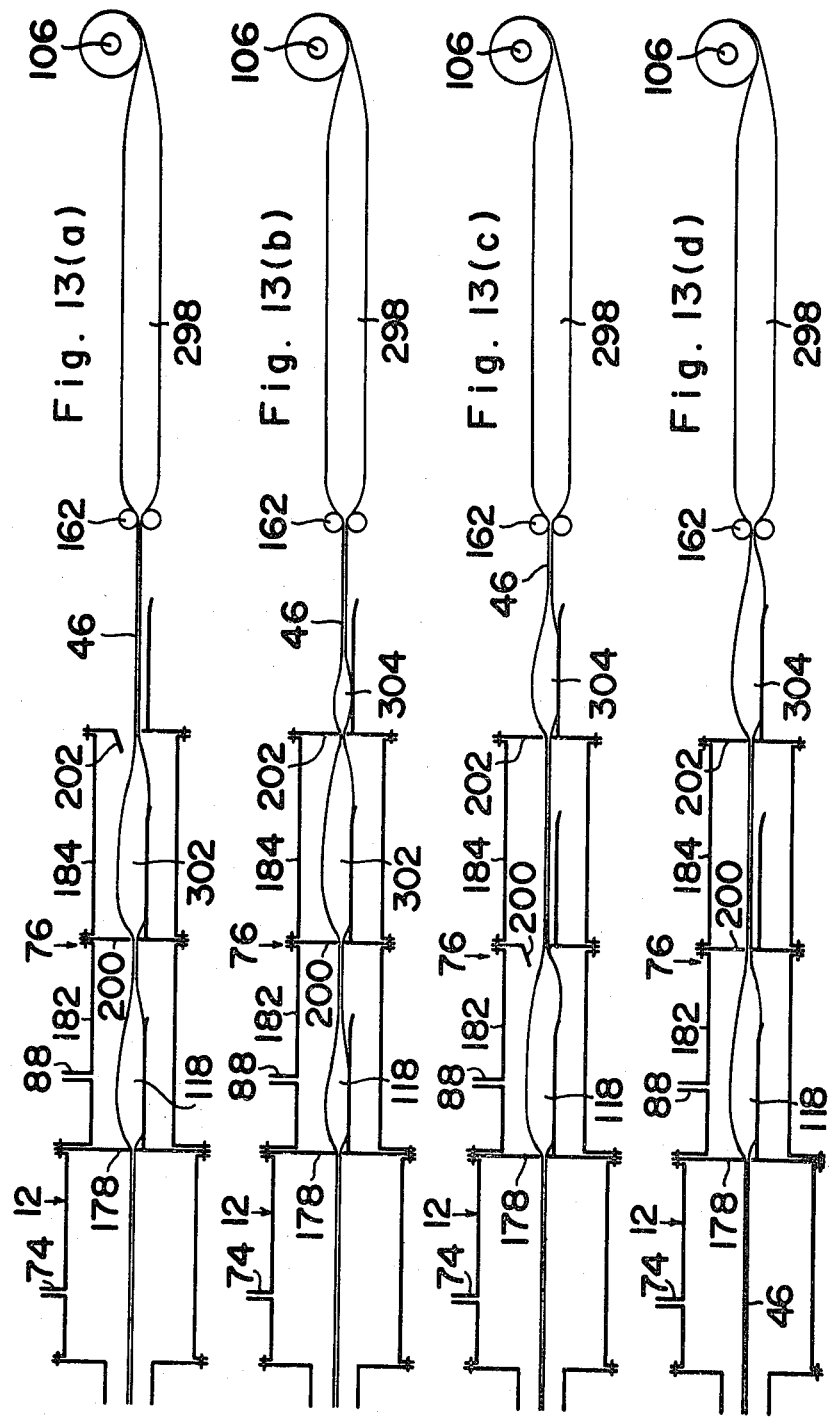

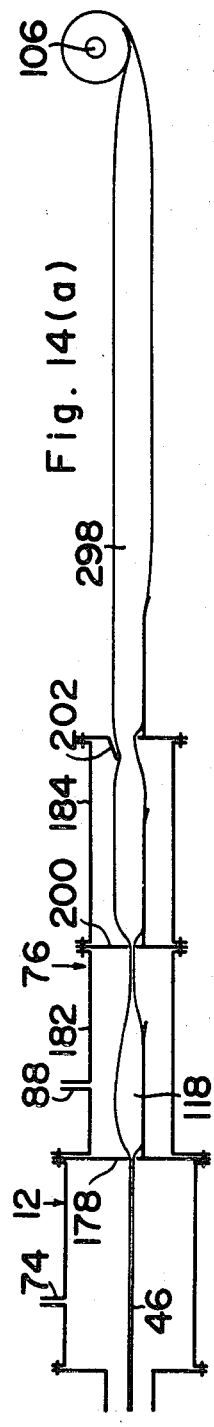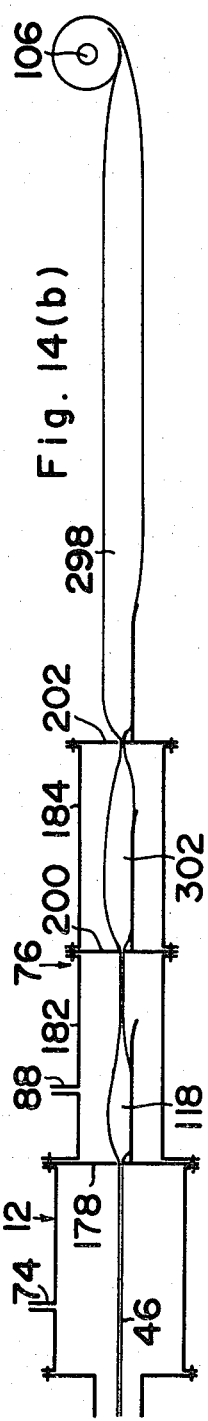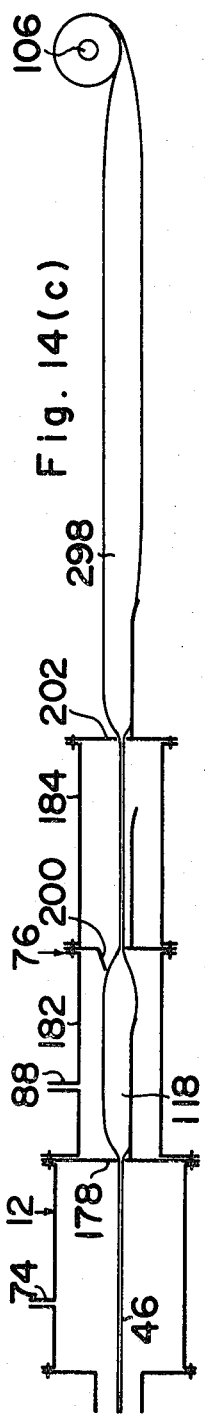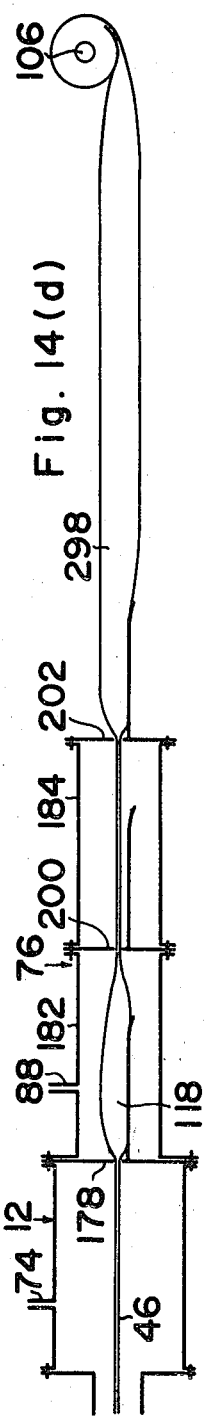

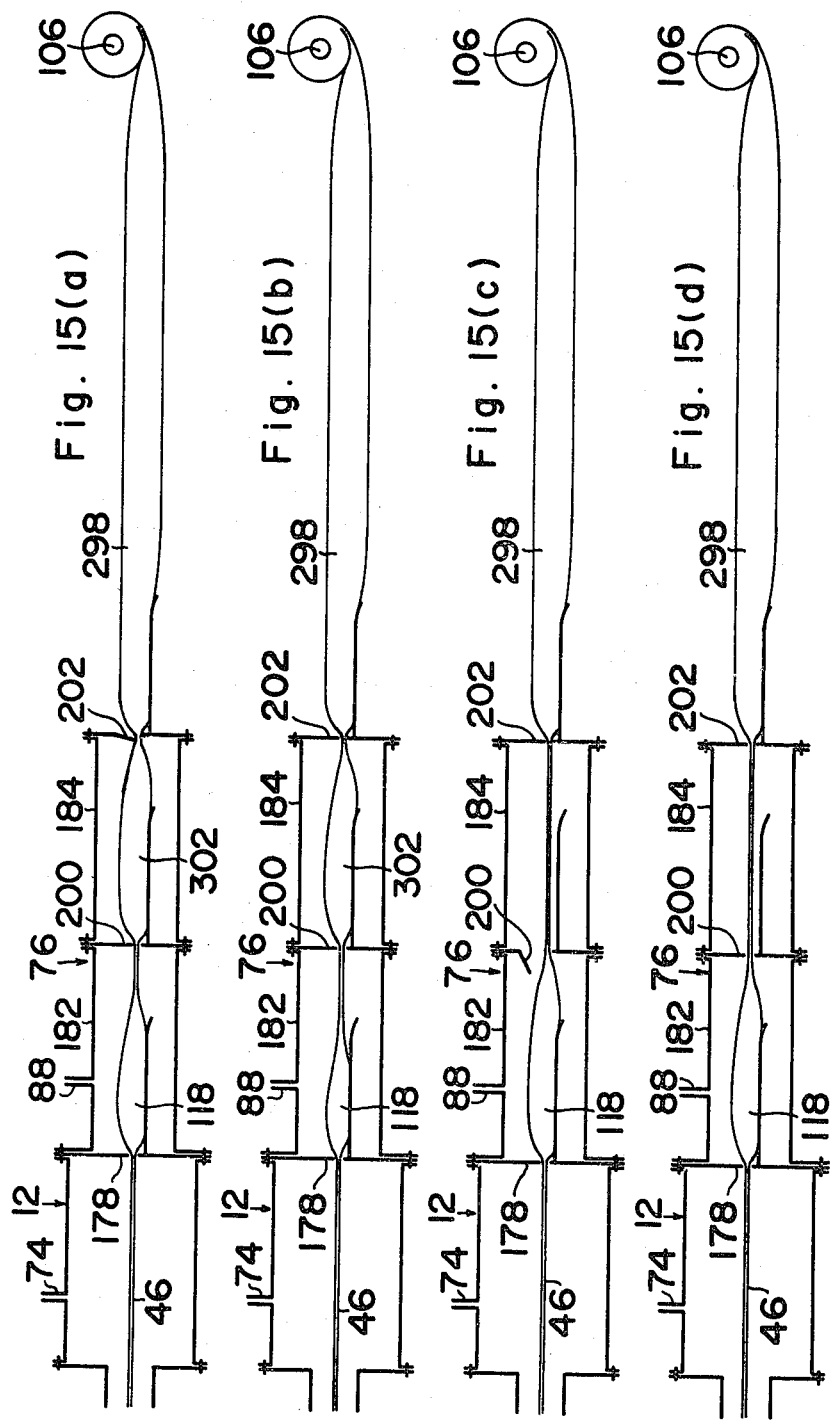

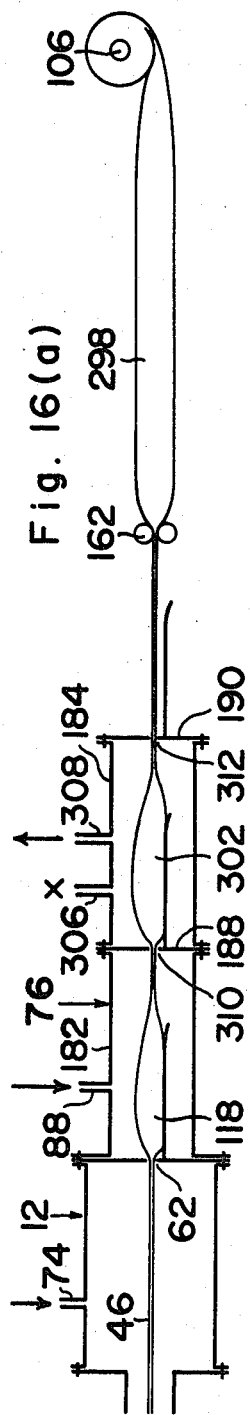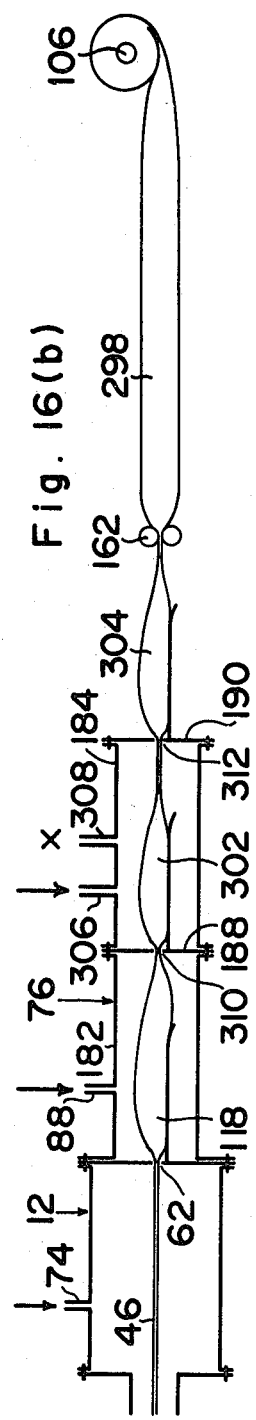

METHOD FOR PROVIDING THE INNER SURFACE OF A PIPE WITH A FLEXIBLE TUBULAR LINING MATERIAL THROUGH A LIQUID RESIN UNDER PRESSURE

BACKGROUND OF THE INVENTION

The present invention relates to a method and an apparatus for providing the inner surface of pipe lines such as those made of steel or the like metal, concrete pipes or rigid resinous pipes, with a flexible tubular lining material through a liquid resin under pressure. More particularly, the present invention relates to a method and an apparatus for providing the inner surface of pipe lines, chiefly those already constructed, for example, underground pipe lines such as gas conduits, city water pipes and pipes enclosing power transmission wires or telephone cables, with a lining to reinforce the pipe lines or to repair damaged portions thereof.

It is well known that when underground pipe lines for gas or water are superannuated or damaged, gas or water leaks out causing many troubles and that deteriorated pipe lines or casings enclosing power transmission wires or telephone cables result in accidents caused by electric leakage or crosstalk. A countermeasure from the past to prevent such troubles is that when such underground pipe lines are superannuated, the pipe lines are dug up over the length of several ten to several hundred meters and replaced with new ones. In this case, however, supply of city water or gas has to be discontinued for a long period of time until the pipe replacing task has been finished. In case superannuated pipes are buried under public roads, people encounter much trouble and inconvenience since traffic on the roads is limited during the work for digging up such superannuated pipes and replacing them with new ones. Further, much labor and cost are required for renewing the pipes in addition to difficulty in the work itself for pipe exchange. Once more, it is not unusual that many of the known methods for renewing the deteriorated or damaged pipes cannot be utilized, due to the particular situations of the place where such pipes are buried. Thus, there is a great demand for the development of a new method for repairing and/or reinforcing pipes, especially those buried in the ground without necessitating difficult measures, for example, digging up the buried pipes.

In recent years, a strong probability of a big earthquake has been reported in many places in the world with the development of an earthquake predicting technique and consideration is being given to reinforcing underground pipes regardless of whether such pipes are superannuated or not to protect them from damage by earthquake. A method wherein a flexible plastic tube is inserted into underground pipes and bonded to the inner surface thereof is newly proposed for attaining both purposes of repairing damaged portions of the pipes and reinforcing the pipes so as to withstand mechanical shock by earthquake. In such a method, however, the step for inserting the flexible tube into the underground pipes is extremely difficult so that the work is almost impossible to execute in such places where the pipes are long or are curved in several portions.

Under such circumstances, a new method for providing pipes with a lining material with evagination wherein a flexible tube is inserted into a pipe while turning the tube inside out by the action of a pressurized fluid such as compressed air and bonded at the same time onto the inner surface of the pipe by the aid of a binder, was developed and has particularly been watched with interest in recent years. This method is advantageous in that insertion of a lining material into a pipe is easy and requires only a short period of time; the lining material is easily bonded onto the inner surface of the pipe; the treatment is applicable to pipes of a large or small diameter; and the process is operable even in the case when the pipe is curved in several portions. The method of this type is disclosed in U.S. Pat. Nos. 2,794,758, 3,132,062, 3,230,129 and 3,494,813 and British Pat. Nos. 1,025,011, 1,069,623 and 1,002,131.

British Pat. No. 1,002,131 relates to a method and device for evaginating a flexible tube but fails to give any description or suggestion on insertion of the tube into a pipe. British Pat. No. 1,025,011 discloses the means for inserting a tube into a pipe while turning the tube inside out. In this patent, however, the tube is not bonded only to the inner surface of the pipe and no technique is disclosed for this purpose. In U.S. Pat. Nos. 2,794,758, 3,132,062 and 3,494,813 and British Pat. No. 1,069,623 there is disclosed respectively a method for inserting a tube into a pipe while turning the tube inside out and bonding the tube onto the inner surface of the pipe. However, all of these known arts disclosed in these patents require previous application of a binder onto the inner surface of a pipe or tube prior to insertion of the tube. In case a tube is bonded as a lining to a pipe, an ordinary binder containing a volatile component cannot be used for the reason that both pipe and tube should be impervious. In such a method, therefore, the use of only a binder of such type that it contains no volatile component and the resinous component is curable with the lapse of time comes into question. When a binder is previously applied onto the inner surface of a pipe or tube, a considerably longer period of time is required until the binder is prepared and completely applied onto the inner surface, so that curing of the binder already starts prior to the insertion of the tube into the pipe, thus resulting in insufficient adhesion of the lining onto the inner surface of the pipe. The use of a binder having an extended pot life is thus required to prevent such premature curing but the time necessary for complete curing of the binder after the insertion treatment of the tube becomes invariably long.

U.S. Pat. No. 3,230,129 discloses a method wherein the inside of a pipe is charged with a binder and a tube is inserted into the pipe from one end thereof while turning the tube inside out and pushing the binder forward thereby bonding the evaginated portion of the tube onto the inner surface of the pipe by the aid of the binder remaining on the inner surface. However, this method has also a number of drawbacks. First of all, the quantity and distribution of the binder cannot be controlled at all so that the binder is almost absent in some areas between the pipe and the tube but is present in some areas in an extremely large amount between the pipe and the tube which is sufficient to make the path of gas or water locally narrower. Secondly, the binder must be used in an amount larger than that needed for bonding the tube to the pipe because the tube is allowed to proceed with simultaneous evagination within the pipe while pushing the binder forward. An excess amount of the binder in this case is, after all, discarded. Thirdly, when the pipe is inclined, for example, in such manner that the entrance of the tube is lower, the head pressure of the binder acts on the top or turning point of the proceeding tube where evagination occurs, so that the pressure required for evagination of the tube is fluctuated and the amount of the binder interposed between the pipe and the tube tends to vary.

Therefore, none of the prior art methods succeeded in providing pipes, especially those buried in the ground, with a lining according to a simple operation conducted in situ without moving or disjointing the pipes. In these circumstances, there is a great demand for development of a new method which entirely overcomes these drawbacks.

BRIEF SUMMARY OF THE INVENTION

It is an object of the present invention to provide a new method for providing the inner surface of a pipe with a flexible tubular lining material by inserting the tubular lining material into the pipe while turning the tubular lining material inside out, applying at the same time a liquid resin onto the inner surface of the tubular lining material uniformly in a definite thickness and bonding the lining material onto the inner surface of the pipe with the liquid resin being interposed therebetween under pressure.

It is another object of the present invention to provide a flexible tubular lining material for reinforcement, bonded firmly onto the inner surface of a pipe by the aid of a liquid resin.

It is still another object of the present invention to provide a method for applying a liquid resin evenly onto the inner surface of a pipe which comprises inserting a flexible tubular material into a pipe while turning the tubular material inside out, applying a liquid resin at the same time onto the inner surface of the tubular material evenly in a definite thickness and thereafter pulling back the inserted tubular material.

It is further object of the present invention to provide a method for easily adjusting the thickness of a liquid resin applied onto the inner surface of a flexible tubular lining material.

It is still a further object of the present invention to provide a method for bonding an extremely long flexible tubular lining material onto the inner surface of a pipe with a liquid resin of a definite thickness being interposed therebetween under pressure.

It is yet another object of the present invention to provide an apparatus suitable for the aforesaid objects.

It is yet a further object of the present invention to provide an apparatus actuated only by the pressure of a fluid.

It is an additional object of the present invention to provide an apparatus which is operated easily and can overcome any trouble in a simple manner.

Other objects, features and advantages of the present invention will become apparent more fully from the following description.

DETAILED DESCRIPTION OF THE INVENTION

It has now been found surprisingly that the above mentioned disadvantages of the prior art in providing a pipe with a lining can entirely be overcome basically by a method wherein a reservoir of a liquid resin is formed in the interior of the unevaginated portion of a flexible tubular lining material positioned in the rear of the fixed point of the lining material to a pipe and a fluid pressure is applied externally to the portion of the lining material where the reservoir is formed, thereby pushing the lining material forward under evagination within the pipe and squeezing the lining material at the same time to adjust the quantity of the liquid resin applied onto the inner surface of the lining material.

The present invention can more fully be understood from the following description taken in conjunction with the accompanying drawings in which:

FIG. 2 is a perspective view showing a bulkhead.

Figure 1:
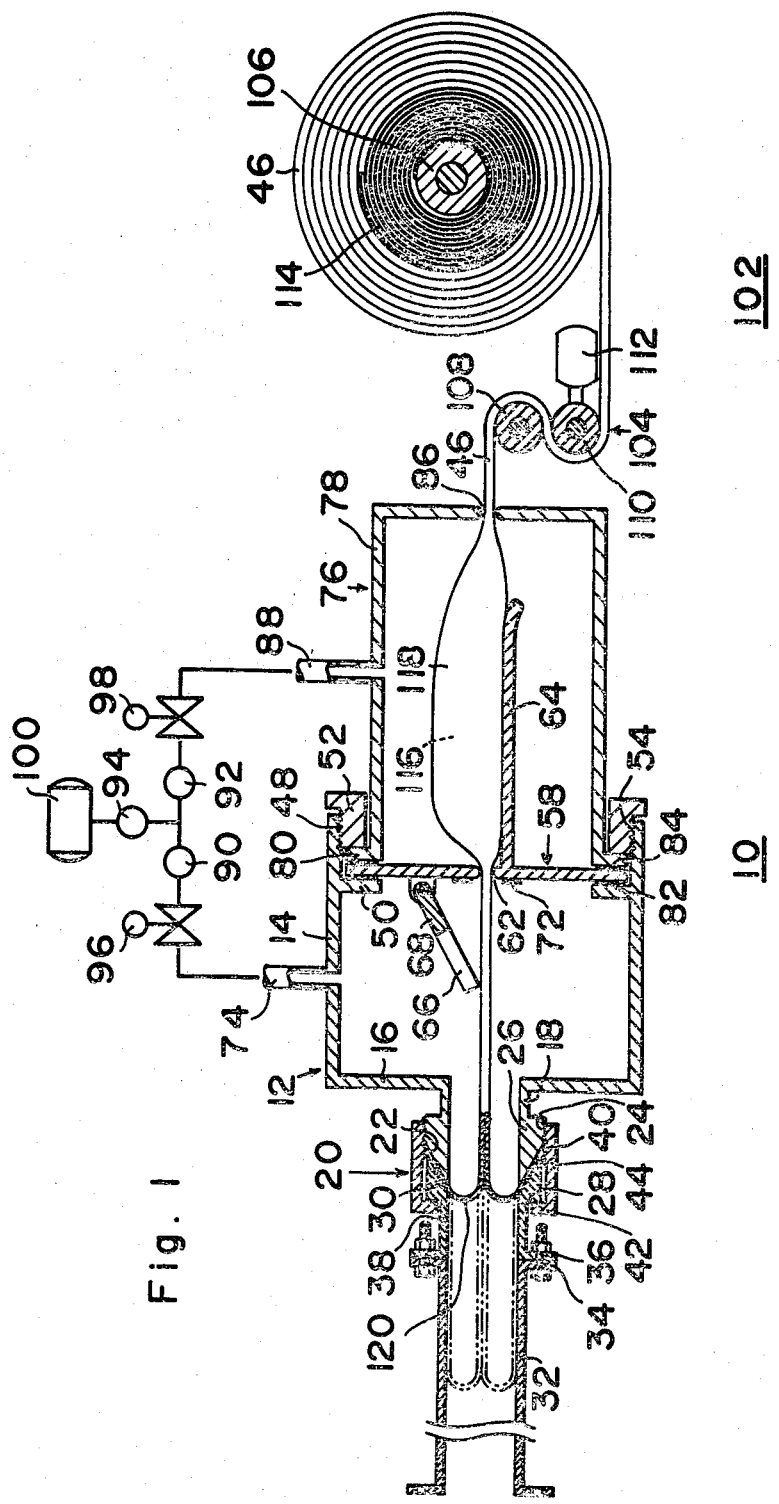
FIG. 1 is a schematic side view showing an example of the apparatus of this invention.

FIGS. 3(a)–(e) are diagrams showing the procedure of the method of this invention using the apparatus shown in FIG. 1.

FIG. 4 is a longitudinal sectional view showing a variant of the pressure cylinder.

FIG. 5 is a longitudinal sectional view showing another variant of the pressure cylinder.

FIG. 6 is a schematic side view showing another example of the apparatus of this invention put in practical use.

FIGS. 7(a)–7(c) are schematic side views showing the details of individual parts of the apparatus shown in FIG. 6.

FIG. 8 is a perspective view showing an example of the variable squeezing device.

Figure 9:
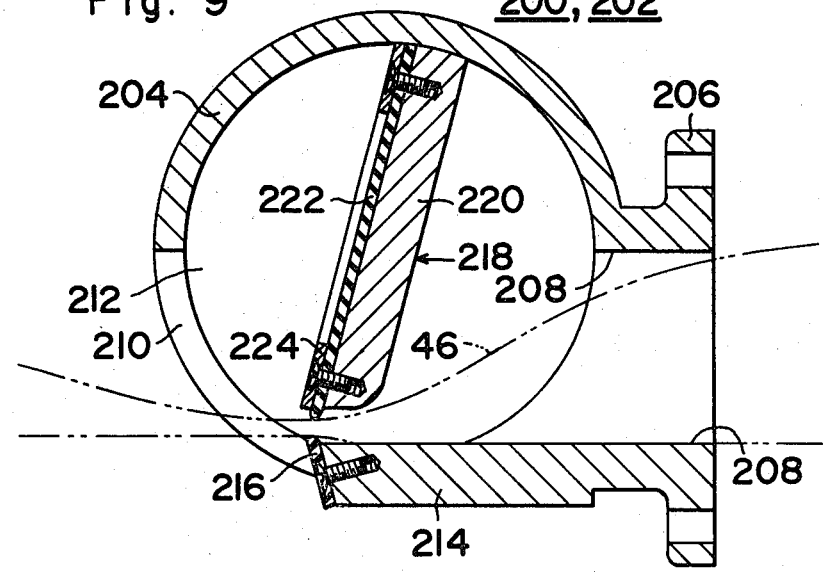

FIG. 9 is a sectional view showing the variable squeezing device put in action.

Figure 10:

FIG. 10 is a sectional view showing a moving plate of the variable squeezing device.

Figure 11:
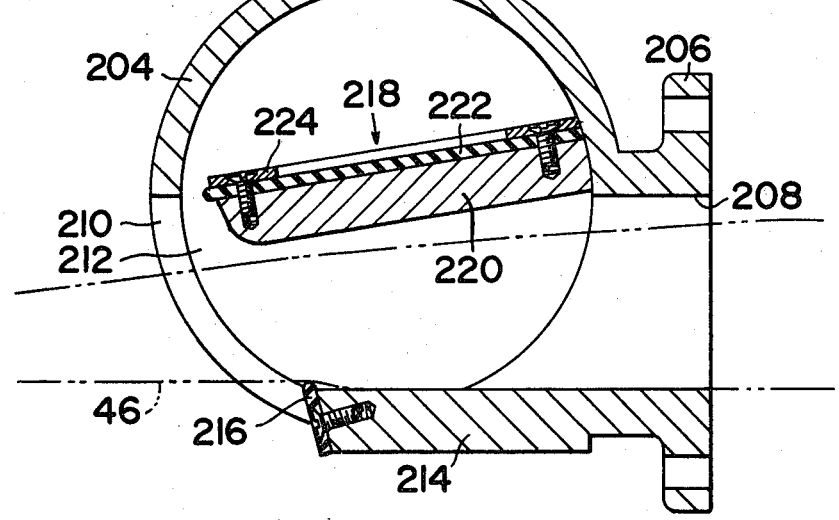

FIG. 11 is a sectional view showing the variable squeezing device relieved from action.

FIG. 12 is a cross sectional view showing a shut-off device of the apparatus shown in FIG. 7(c) put in action.

FIGS. 13(a)–(d) are diagrams showing the procedure according to one embodiment of the method of this invention using the apparatus shown in FIG. 6.

FIGS. 14(a)–14(d) are diagrams showing the procedure according to another embodiment of the method of this invention using the apparatus shown in FIG. 6.

FIGS. 15(a)–15(d) are diagrams showing the procedure according to still another embodiment of the method of this invention using the apparatus shown in FIG. 6.

FIGS. 16(a) and 16(b) are diagrams showing the procedure according to a further embodiment of the method of this invention using the apparatus shown in FIG. 6.

In FIG. 1, an example of the apparatus of this invention consists of a pressurizing evagination device 10 and a supply device 102 for a flexible tubular lining material 46. The pressurizing evagination device 10 consists of two compartments, a pressure container 12 and a pressure cylinder 76, partitioned with a bulkhead 58, the two compartments being connected to a pressure supply device. The pressure container 12 has a drum 14 and a bottom plate 16 provided in the central part thereof with a connecting assembly 20 through a discharge pipe 18. The connecting assembly 20 comprises a nozzle 26 fixed integrally at the rear end to the tip of the discharge pipe 18 and provided with a surface 22 tapered to the end and with a male screw 24 at the outer periphery thereof, a connecting pipe 38 provided at the rear end thereof with a step 28 and a tapered surface 30 fitting the tapered surface 22 and at the front end thereof with a flange 36 to be connected to a flange 34 of a pipe line 32 to be treated, and a fastening pipe 44 forming on the inner periphery thereof a female screw 40 to be engaged with the male screw 24 and provided at the front end thereof with a step 42 which is fit to the step 28. A pair of the tapered surfaces 22 and 30 functions as an annular fastener and the front end of the tubular lining material 46 is fixed to the connecting assembly between the tapered annular surfaces 22 and 30 forming the annular fastener. The rear portion of the drum 14 is opened and forms at the rear end thereof a female screw 48. In front of the female screw 48 is formed an inwardly extending annular protuberance 50 to which the bulkhead 58 is attached. The pressure container 12 is provided with an inlet 74 for pressurized fluid.

The pressure cylinder 76 has a cylindrical drum 78 smaller in diameter than the drum 14 and an open front end with an outwardly extending annular protuberance 80. The bulkhead 58 and the annular protuberance 80 are tightly fixed through packings 82 and 84 to the annular protuberance 50 by means of a fastening ring 52 forming on the outer periphery thereof a male screw 54 to be engaged with the female screw 48. The pressure cylinder 76 is provided with an inlet 88 for pressurized fluid and is closed at the rear end of the drum 78 except for a slit 86 through which the tubular lining material 46 passes in a flattened form.

The supply device 102 consists of an evagination velocity controlling assembly 104 and a reel 106 on which the lining material 46 is wound. The evagination velocity controlling assembly 104 involves a pair of rolls 108 and 110 finding a path of "S" letter for the lining material 46 and a motor 112 for positively rotating the roll 110 so that the running speed of the lining material reeled off is adequately controlled by varying the rotation speed of the roll 110.

The other (rear) open end of the tubular lining material 46 is connected to a rope (or cord) 114 having a length at least equal to that of the lining material. The rope 114 and the lining material 46 are wound on the reel 106 in such manner that the rope 114 is wound first. Utilizable as the rope 114 are flexible ones such as belts, tapes, ropes, wires and cords possessing a sufficient tensile strength. The use of a flat one such as a belt is preferable in the present invention.

The lining material 46 used in the present invention is flexible and impervious and in the form of a tube. The lining material should be so flexible that it can very easily be folded in flattened state and expanded to a cylindrical form by application of internal pressure. As base materials for the lining material 46, natural rubber, polychloroprene, styrene-butadiene rubber, nitrile rubber, ethylene-propylene rubber, butyl rubber and the like synthetic rubbers, polyamide, polyurethane, polyolefin, polyvinyl chloride, elastomers of polyester resins and other synthetic resins come into question. Utilizable as the flexible tubular lining material for the present invention is, for example, a flexible tubular material manufactured by bonding a coating of such base material integrally onto the outer periphery of a tubular textile jacket made of a natural fiber such as cotton or hemp, a fiber of a synthetic resin such as polyvinyl alcohol, rayon, polyamide, polyester or polyether, or an inorganic fiber such as glass fiber or carbonaceous fiber, woven or knitted in a tubular form. A tubular textile jacket made of a synthetic fiber of polyester series knitted in a tubular form which has been coated on its outer surface with a polyester elastomer is especially preferable as a lining material for pipes. The polyester elastomer is a block copolymer of an aromatic polyester and an aliphatic polyetherdiol and is regarded as a thermoplastic synthetic resin which is flexible and gas-impervious and is excellent in rubbery elasticity, moldability, heat-resistance, weather-resistance, water-resistance, oil-resistance, chemicals-resistance and abrasion-resistance. This elastomer is suitable as a base material for the lining material, because of its high tensile strength and tear strength and its good adhesion to synthetic fibers of polyester series. This elastomer is commercially available under the registered trademarks "Hytrel" (DuPont, U.S.A.) and "Pelprene" (Toyobo, Japan).

The pressure supply device is connected to both the pressure container 12 and the pressure cylinder 76 through the inlets 74 and 88, respectively, and comprises a compressor 100, pressure control valves 96 and 98, valves 90, 92 and 94 and pipe lines connecting the pressure container 12 and the pressure cylinder 76 to the compressor 100 through these valves. The inner pressure of the pressure container 12 is usually kept almost equal to that of the pressure cylinder 76 by the action of the pressure control valves 96 and 98 but it is possible to make a pressure gradient between both compartments 12 and 76, if so desired.

As the front end of the tubular lining material 46 is fixed in evaginated state to the annular fastener, a turning point 120 at which evagination occurs exists in the lining material 46 in slight rear of the fixed point. When the fluid pressure is applied to the pressure container 12 and the pressure cylinder 76, the lining material 46 is pushed forward within the pipe 32 as shown by the chain line whereby the turning point 120 advances correspondingly.

The tubular lining material 46 is previously charged in the interior thereof with a liquid resin 116 as binder to form a reservoir 118. The portion of the lining material 46 where such reservoir 118 is formed is placed in the pressure cylinder 76 and partitioned from the pressure container 12 by the bulkhead 58.

When the tubular textile jacket having a coating of rubber or a synthetic resin on the outer surface thereof is used as the lining material 46, the liquid resin 116 as binder present in the interior of the tubular textile jacket is entered in a sufficient amount into interstices formed in the reticulate structure of the textile jacket. When the lining material 46 carrying a large amount of the liquid resin is turned inside out within the pipe 32, the liquid resin-coated inner textile surface of the lining material is changed to the outer surface in contact with the inner periphery of the pipe 32 and bonded thereto firmly with the aid of the sufficient amount of the liquid resin whereby a strong reinforcing layer having a structure similar to FRP is formed on the inner surface of the pipe 32. By providing the pipe with such reinforcing layer, even a superannuated pipe can be reinforced and withstands the use for a long period of time.

In FIG. 2 showing the details of the bulkhead 58, a disk 60 serving as a partition wall is provided at the central part thereof with a slit 62 through which the lining material 46 passes. The slit 62 also serves to adjust the quantity of the liquid resin 116 as binder to be applied onto the inner surface of the lining material 46. In this case, the width of the slit 62 is determined taking the amount of liquid resin 116 to be applied and the thickness of the lining material 46 into consideration. It is preferable to provide the slit 62 with a device for externally adjusting the width precisely. A plate 68 having a notch 66 is movably supported on the front side surface of the disk 60 by means of a shaft 70 so that when the plate 68 moves downward, it is contacted with a packing 72 to shorten the length of the slit 62.

In FIG. 3(a) is shown the first stage of the method of this invention using the apparatus shown in FIG. 1. The lining material 46 wound in flattened state on the reel 106 is reeled off and the front end thereof is introduced into the pressure cylinder 76 through the evagination velocity controlling assembly 104 and the slit 86 formed in the rear part of the cylinder. In the pressure cylinder 76, a sufficient quantity of the binder 116 is poured into the interior of the lining material 46 to form a reservoir 118 for the binder.

As the binder is used over a broad area to bond the lining material 46 onto the inner periphery of the pipe 32, the binder should preferably be non-volatile, or in other words, should preferably be free of any volatile matter such as a solvent or moisture. Thus, the use of a non-solvent type binder which is self-curable at ordinary temperature or curable merely by heating is desirable in the present invention. Illustrative of the preferable binders are, for example, those of epoxy type, acrylic type and polyester type. The liquid resinous binder into which micro-capsules containing a curing agent or curing accelerator have been dispersed can also be used effectively. Any of the binders can be used in the present invention according to the intended purpose. The quantity of the binder 116 to be charged into the lining material 46 is easily determined taking into consideration the amount of the binder to be applied to the lining material 46 of a unit length and the full length of the lining material 46 to be applied onto the inner surface of a pipe 32.

The lining material 46 is again flattened and passed through the slit 62 in the bulkhead 58 and the front end of the lining material is fixed in evaginated state to the annular fastener of the connecting assembly 20 positioned in the pressure container 12. The connecting pipe 38 is then connected to the pipe 32 to be treated and, on the other hand, the fastening ring 52 is engaged with the female screw 48 to combine the pressure container 12 integrally with the pressure cylinder 76. The portion of the lining material 46 where the reservoir 118 is formed is placed on the shelf 64 in the pressure cylinder 76.

In FIG. 3(b) showing the second stage of the method of this invention, fluid pressure is applied to both the pressure container 12 and the pressure cylinder 76, for example, by sending compressed air through the inlets 74 and 88 and at the same time the evagination velocity controlling assembly 104 is operated to push the lining material 46 forward within the pipe 32 whereby the turning point 120 of the lining material 46 formed in slight rear of the annular fastener is pressurized internally to push the lining material 46 forward while turning it inside out. The evaginated portion of the lining material 46 has a layer of the binder on the outer surface thereof and is readily attached under pressure to the inner surface of the pipe 32 with the layer of the binder being interposed therebetween.

With the advance of the turning point 120, the lining material is supplied from the device 102 through the assembly 104 and the slit 86 and then passed through the reservoir 118 in the pressure cylinder 76 and the slit 62 whereby an adjusted amount of the binder 116 is applied onto the inner surface of the lining material 46.

In FIG. 3(c) showing the third stage of the method of this invention, supply of the lining material 46 to the pressurizing evagination device 10 has been finished and the rope 114 connected to the rear end of the lining material 46 is successively supplied to the device 10. An excess amount of the binder 116 enclosed in the lining material 46 is squeezed at the slit 62 by the action of the plate 68 and drops on the bottom of the pressure cylinder 76. The excess binder is recovered after completion of the treatment. As the plate 68 has a notch 66 to shorten the length of the slit 62, the plate 68 drops as soon as the lining material is passed through the lower end of the plate 68, whereby only the rope 114 is allowed to pass through the slit 62 and any excess binder remaining on the shelf 64 is not permitted to pass through the slit 62.

In FIG. 3(d) showing the fourth stage of the method of this invention, bonding of the evaginated lining material 46 to the inner surface of the pipe 32 is finished over the full length of the lining material and only the rope 114 is retained in the pipe 32. The bonded lining material is allowed to stand as such for a while until the curing of the binder is finished.

In FIG. 3(e) showing the last stage of the method of this invention, the device 10 is removed and both edges of the lining material 46 are cut off whereby the application of the lining material 46 onto the inner surface of the pipe 32 is finished.

According to the method of this invention, a reservoir 118 for the binder 116 is formed in rear of the pressure container 12 and the lining material 46 is provided on the inner surface thereof with a layer of the binder 116 when passed through the reservoir 118. The amount of the binder applied is adjusted when the lining material is passed through the slit 62 in the bulkhead 58. The lining material 46 thus treated is then evaginated in the device 10 and bonded under pressure onto the inner surface of the pipe 32. In the method of this invention, therefore, it is not necessary to apply previously the binder 116 evenly onto the inner surface of the lining material 46. The binder 116 may be freshly prepared just before the treatment in the method of this invention. As the time required for the operation is relatively short in the method of this invention, a binder having a relatively short pot life can also be employed without trouble. In addition, the lining material 46 can be bonded firmly and evenly onto the inner surface of the pipe 32.

One of the characteristic features of the present invention resides in (a) the formation of a reservoir 118 for the binder 116 in the interior of the lining material 46 placed in the pressure cylinder 76 and (b) the application of an external fluid pressure at all times to the portion of the lining material 46 wherein the reservoir 118 is formed. If the external fluid pressure is not applied to the pressure cylinder 76 where the reservoir 118 exists, the external pressure is only applied to the pressure container 12 where the lining material 46 is also pressurized externally whereby the binder 116 attached onto the inner surface of the lining material 46 is pushed backward from the slit 62. According to the present invention, however, external pressure is applied not only to the pressure container 12 but also to the pressure cylinder 76 so that the pressure in the two compartments 12 and 76 is kept in equilibrium state. Thus, the external pressure applied to the lining material 46 in front and rear of the slit 62 is balanced so that an adequate amount of the binder 116 is applied onto the inner surface of the lining material 46 when the lining material is passed through the reservoir 118. As the two compartments 12 and 76 in the device 10 are separated with the bulkhead 58, the pressures in both compartments can be controlled separately to form a pressure gradient between them. For example, the amount of the binder 116 applied onto the inner surface of the lining material 46 can be adjusted by controlling the fluid pressure in the pressure container 12 and the fluid pressure in the pressure cylinder 76 separately to form a pressure gradient between both compartments. More precisely, if the fluid pressure in the pressure cylinder 76 is higher than that in the pressure container 12, the amount of the binder 116 applied onto the inner surface of the lining material 46 will be increased. On the other hand, if the pressure in the pressure cylinder 76 is lower than that in the pressure container 12, the amount of the binder 116 applied onto the inner surface of the lining material 46 will be decreased. In addition, the fluid pressure required for evagination of the lining material 46 may be varied according to the condition of the pipe 32. For example, if the pipe 32 is bent in several portions, a higher pressure will be required to allow the turning point 120 of the lining material 46 to pass the bent portions. When a higher fluid pressure is applied to the pressure container 12 for this purpose, the amount of the binder 116 applied onto the inner surface of the lining material 46 will tend to decrease even if the pressure equal to that in the pressure container 12 is applied to the pressure cylinder 76. In such case, a higher pressure is applied to the pressure cylinder 76 to prevent local change in the amount of the binder 116 applied. Further, the quantity of the binder 116 applied onto the inner surface of the lining material 46 tends to decrease also in the event the evagination of the lining material proceeds and the amount of the binder 116 in the reservoir 118 is decreased. In such case, the problems will be solved by increasing the pressure in the pressure cylinder 76 gradually.

In the application of a lining material onto the inner surface of a pipe, it is generally desired to use a large amount of a binder for ensuring strong adhesion of the lining material to the pipe. Accordingly, it is preferable in the method of this invention to maintain the pressure in the pressure cylinder 76 at least equal, preferably somewhat higher than that in the pressure container 12.

In the apparatus shown in FIG. 1, it is supposed that the binder 116 may counterflow beyond the slit 86 if the pressure in the pressure cylinder 76 becomes higher. In the practical use, however, no counterflow of the binder 116 was found even in the case of increasing the pressure in the pressure cylinder 76, probably for the reason that the binder 116 is viscous and the lining material 46 is continuously supplied from the device 102.

FIG. 4 shows one example of the modified pressure cylinder 76 wherein the slit 86 is mounted to the upper position of the rear end. The lining material 46 introduced into the pressure cylinder 76 through the slit 86 once descends and passes through the slit 62. In this modification, a sufficient amount of the binder 116 can be applied onto the inner surface of the lining material 46 by the head pressure of the binder 116 in the reservoir 118.

FIG. 5 shows another example of the modified pressure cylinder 76 wherein the shelf 64 is constructed by a pair of frames 128 fitted to the rear side of the bulkhead 58 and a number of rolls 130 mounted to the frames 128. According to this example, it is of advantage that the resistance to friction of the lining material 46 passing through the reservoir 118 is minimized by means of a number of the rolls 130. It is also possible to combine the modifications shown in FIGS. 4 and 5 to achieve further improved effects.

In FIGS. 6 and 7 is shown another or more improved example of the apparatus of this invention. An enlarged side view of the apparatus shown in FIG. 6 is shown in three portions in FIGS. 7(a)-7(c) except that some revision is made in the part shown in FIG. 7(c).

In FIG. 6 and FIG. 7(a), a supply device 102 for a flexible tubular lining material 46 comprises a reel 106 for the lining material 46 and a roller-conveyer 150 and is assembled on a platform car 152 so that the device 102 makes itself freely movable. The reel 106 comprises a frame 154 fixed to the rear part of the car 152, a shaft 156 mounted freely rotatably to the frame 154. The rear open end of the tubular lining material 46 is connected to a belt 114 having a length at least equal to that of the lining material. As in the case shown in FIG. 1, the belt 114 and the lining material 46 are wound on the shaft 156 in such manner that the belt 114 first comes and then the lining material 46 in flattened state comes.

The roller-conveyer 150 comprises a frame 158 fixed to the platform car 152 and a number of rollers 160 mounted freely rotatably to the frame 158 and supports the lining material 46 reeled off from the reel 106. A large amount of a binder 116 sufficient enough to bond the lining material to the inner surface of a pipe 32 to be treated is enclosed in the tubular lining material 46 running on the roller-conveyer 150. The binder 116 in this case is also preferably free from volatile matters and is desirably the one curable at ordinary temperature or merely by heating. The binders mentioned in the example shown in FIG. 1 also come into question. In front of the roller-conveyer 150 is placed a nipping device 162 which comprises a frame 164 fixed to the platform car 152 and a pair of rolls 166 mounted freely rotatably to the frame 164. The lining material 46 is allowed to pass between the pair of rolls 166 to control the amount of the binder 116 carried by the running tubular lining material 46 whereby a large amount of the binder 116 can gradually be carried with the lining material to prevent moving of the binder 116 in an excessively large amount at a time.

In FIG. 6 and FIG. 7(b), a pressurizing evagination device 10 is assembled on a platform car 168 so that the device 10 makes itself freely movable. The device 10 consists of two parts; a pressure container 12 and a pressure cylinder 76 separated by a bulkhead 58. The pressure container 12 has a cylinder drum 14 which is fixed to the platform car 168 and is provided at the front end thereof with a cover 16 having a discharge pipe 18 in the central part thereof. The pressure container 12 is provided in the drum 14 with an inlet for a pressurized fluid. Within the pressure container 12 is situated on evagination velocity controlling assembly 104 comprising a pair of facing caterpillar belts 172 each externally driven by two wheels 170. A number of laterally extending protuberances 174 are formed on each caterpillar belt 172 in such manner that the protuberances 174 on the two caterpillar belts are faced to each other. The flattened tubular lining material 46 is nipped between the facing protuberances 174 and conveyed forward by the action of the caterpillar belts 172 driven at an almost constant speed. The evagination velocity controlling assembly 105 may be provided with an auxiliary device which can detect the tension of the lining material 46 in front of the assembly 104 and can control the speed of the caterpiller belts 172 so as to keep the tension almost constant at all times.

The bulkhead 58 is mounted to the rear end of the drum 14 to separate the pressure container 12 from the pressure cylinder 76 and has a laterally long slit 176 in the central part thereof. A shelf 64 is fixed to the rear side of the bulkhead 58 in such manner that the upper surface of the shelf 64 is almost same in height as the lower edge of the slit 176. A squeezing device 178 is fixed to the front side of the bulkhead 58. The structure and function of the squeezing device will be described in detail hereinafter.

The pressure cylinder 76 separated from the pressure container 12 by the bulkhead 58 fixed to the rear end of the latter comprises a front drum 182 and a rear drum 184 each being usually rectangular or circular in cross section and being fixed to the platform car 168. The front drum 182 is provided with an inlet 88 for a pressurized fluid. Partition walls 188 and 190 are mounted between the front drum 182 and the rear drum 184 and to the rear end of the rear drum 184, respectively, and have laterally long slits 192 and 194, respectively, in the central part. Shelves 196 and 198 similar in structure to the shelf 64 are fixed to the rear sides of the partition walls 188 and 190, respectively, and on the other hand, variable squeezing devices 200 and 202 are fixed to the front sides of the partition walls 188 and 190, respectively.

In FIG. 6, an induction pipe 256 is inserted between a connecting assembly and the discharge pipe mounted to the front cover of the pressure container 12. The induction pipe 256 itself is a flexible pipe such as a corrugated pipe, a flexible pipe made of rubber or a soft plastic material or a hose manufactured from the flexible pipe by reinforcing with a thin fabric. The use of such induction pipe is not essential in the present invention but is preferable for treating pipe lines 32 buried in the ground. For this purpose, a hole 300 to be dug should be large enough to accommodate the pressurizing evagination device 10, the supply device 102 for the lining material 46 and workers. The use of the induction pipe 256 makes it possible to minimize the size of the hole 300 and to leave most of the apparatus on the ground. The connection assembly may be provided with a spray device 288 to reduce friction of the tubular lining material 46.

In FIG. 7(b), the lining material 46 is introduced into the pressurizing evagination device 10 from the rear end of the pressure cylinder 76 through a second variable squeezing device 202, the rear drum 184, a first variable squeezing device 200, the front drum 182 and a squeezing device 178 in the written order and is pushed forward through the discharge pipe 18 by the action of the evagination velocity controlling assembly 104. If moving plates in the variable squeezing devices 200 and 202 are rotated anticlockwise or, in other words, they are moved from the position of "open" to the position of "close", the lining material 46 is squeezed so that the binder 116 enclosed in the lining material 46 and carried therewith is allowed to stay in rear of the variable squeezing devices 200 and 202. In this case, the lining material 46 is airtightly squeezed by the devices 200 and 202 so that the pressurized fluid in front of the devices 200 and 202 in the pressure cylinder 76 does not leak through the devices and the fluid pressure in front of these devices is maintained at a given pressure. However, the devices may not have such a structure that perfect airtightness is secured between the moving plate and the lining material, so far as airtightness to such degree that the fluid pressure in the pressure cylinder 76 is satisfactorily guaranteed.

In the evagination velocity controlling assembly 104, the flattened lining material 46 having the binder 116 applied onto the inner surface thereof is nipped between the facing protuberances 174 on the caterpillar belts 172 and conveyed forward in such state whereby the binder 116 on the inner surface of the lining material 46 is locally squeezed in the nipped portions. The squeezed binder is temporarily built up in the portions of the lining material between the adjacent protuberances 174 but is again dispersed evenly after passing through the assembly 104. The structure of the assembly 104 is not limited to that shown in FIG. 7(b). If the assembly 104 is located in front of the squeezing device 178, however, the assembly 104 should not be of such structure that the lining material 46 is continuously nipped with a strong force. In this case, the lining material 46 should be nipped intermittently as shown in FIG. 7(b). In addition, no limitation is set for the location of the assembly 104. If desired, the assembly 104 may be located in rear of the squeezing device 178 or even in rear of the device 10 as shown in FIG. 1. When the lining material 46 is passed through the squeezing device 178 and the variable squeezing devices 200 and 202, however, a frictional resistance is produced which serves as an initial load and increases the force required for evagination. As far as the improved example of the method of this invention is employed, therefore, the location of the assembly 104 is preferably in front of the squeezing device 178 in the pressure container 12, as shown in FIG. 7(b), to remove such initial load thereby weakening the force required for evagination.

As in the case shown in FIG. 1, the inlets 74 and 78 for pressurized fluid are connected to a compressor 100 through valves 90, 92 and 94 and pressure regulating valves 96 and 98. The pressure container 12 and the pressure cylinder 76 can be pressurized together almost at the same pressure or separately at different pressure by way of the valves 96 and 98.

In FIG. 7(c) is shown a connection device 230 which connects the pressurizing evagination device 10 to a pipe 32 to be treated. The connection device 230 involves in the rear end thereof a shut-off device 232 as an optional device which on one hand can shut-off the path of fluid pressure from the pressure container 12 to the turning point 120 of the lining material 46 on the way but send a given fluid pressure to the turning point 120 through a separate path and on the other hand can inhibit the forward movement of the lining material 46. This shut-off device 232 is not used in usual treatments but is necessary if any trouble occurs in the pressure container 10 or other devices in rear thereof. If a trouble occurs during the treatment, for example, in the pressure container 12, the device 232 is soon put in use to shut-off the path of fluid pressure from the pressure container 12, whereby the forward movement of the lining material 46 is stopped and at the same time a given fluid pressure is applied through a different route to the lining material 46 already evaginated and attached to the inner surface of the pipe 32 until the binder interposed between the inner surface of the pipe 32 and the evaginated lining material has been cured under pressure. During the device 232 being put in operation, the device where troubles occur, e.g. the pressure container 12 is relieved from the fluid pressure and the troubles can be removed. If any trouble occurs during the treatment in the absence of the shut-off device 232, removal of the fluid pressure from the pressure container 12 will result in such disadvantage that since the lining material itself is flexible and is not so rigid as to possess self-supporting property, the evaginated lining material 46 which has been attached onto the inner surface of the pipe 32 is peeled off wholly or partially due to sudden depression of the internal fluid pressure in the pipe 32. Once the lining material 46 has been peeled off locally to form spaced between the lining material 46 and the inner surface of the pipe 32, such spaces will no longer disappear even when fluid pressure is again introduced into the pipe 32, and will result in the formation of pipes reinforced with imperfections. For the above reasons, it is convenient in the present invention to place the shut-off device 232 in any desired location between the pressurizing evagination device 10 and the pipe 32. The details of the structure and function of the shut-off device 232 will be described hereinafter.

The connection device 230 usually comprises, in addition to the connecting assembly 20 for fixing the lining material 46, a connecting assembly 260, an induction pipe 256, a connecting assembly 258, a rotation device 278 and a spray device 288. The connecting assemblies 258 and 260 comprise tubular joint members 266 and 268 having tapered portions 262 and 264 at the tip thereof, urging rings 270 and 272 and locking annuli 274 and 276, respectively. The induction pipe 256 is firmly and air-tightly fixed between the tapered portions 262 and 264 and the urging rings 270 and 272. The tubular point member 268 in the rear connecting assembly 260 is connected to the front connecting pipe 248 in the shut-off device 232 by means of flanges. In case the induction pipe 256 is not used, the incidental parts such as the connecting assemblies 258 and 260 may be omitted.

The rotation device 278 comprises an inner pipe 280 and an outer pipe formed integrally with the tubular joint member 266 in the front connecting assembly 258 and is used for removing any twist formed on construction of the apparatus. The tip of a bolt 284 in screw-threaded engagement with the outer pipe 282 is fitted into an annular groove 286 formed on the outer periphery of the inner pipe 280 so that the inner pipe 280 and the outer pipe 282 are connected freely rotatably to each other. The location of this rotation device 278 is not limited to that shown in FIG.7(c) and the device 278 may be located in any desired portion in the connection device 230. If necessary, a plurality of rotation devices may be assembled in the connection device 230.

The spray device 288 having a spray nozzle 290 is used for spraying a lubricant through the nozzle 290 onto the outer surface of the unevaginated portion of the lining material 46 to reduce frictional resistance formed when the unevaginated portion of the lining material 46 is pushed forward within the already evaginated portion in the pipe 32. The location of the spray device 288 is not limited to that shown in FIG. 7(c) and the device 288 may be located in any desired device in the apparatus of the present invention. The outer surface of the tubular lining material 46 used may be treated previously with a lubricant regardless of whether the spray device 288 is present or absent. When the lining material 46 is treated with a lubricant prior to being introduced into the pressurizing evagination device 10, frictional resistance formed in the variable squeezing devices 200 and 202 and the squeezing device 178 can be reduced but slip of the lining material 46 may occur in the evagination velocity controlling assembly 104 to disturb normal conveying of the lining material 46.

The connecting assembly 20 for fixing the lining material 46 comprises a connecting pipe 38 which, in the front end, is connected to the rear end of the pipe 32 through flanges 34 and 36 and has a tapered portion 292 in the rear end, an urging ring 294 and an annulus 296 formed integrally with the inner pipe 280 in the rotation device 278. The front end of the tubular lining material 46 is evaginated and fixed firmly and air-tightly between the tapered portion 292 and the urging ring 294 which form together an annular fastener for the lining material.

In the present invention, the connecting assembly 20 for fixing the lining material 46 may directly be connected to the pressure container 12 as shown in FIG. 1, for example, in case of treating pipe lines exposed on the ground. In the embodiment shown in FIG. 7(c), the induction pipe 256, the shut-off device 232, the rotation device 278 and the spray device 288 are all incorporated in an arbitrary order into the apparatus for facilitating actual works for treating pipe lines buried in the ground.

In FIGS. 8 and 9 showing the structure and function of the variable squeezing devices 200 and 202, a dome 204 in the shape of a semi-cylindrical dome formed by cutting off the lower half of a lying cylinder has an integrally formed flange 206 in the rear end. The devices 200 and 202 are fixed by the aid of the flange 206 to the partition walls 188 and 190 and have an inner end surface 208 which is almost in accord in height with the lower edge of the slits 192 and 194. The dome 204 has at both sides thereof short cylindrical parts 210 with which a cover 212 is screw-threadedly engaged. One of the covers 212 is omitted in FIG. 8 to depict the inside of the dome 204. A shelf 214 is positioned on the extended axis of the shelf 196 or 198. A panel 216 made of rubber or a plastic material is fixed with a screw bolt to the front end of the shelf plate 214 in such manner that one end of the panel 216 slightly projects from the upper surface of the shelf plate 214.

The moving plate 218 comprises a basal plate 220, a squeezing plate 222 and a pressing plate 224. The basal plate 220 is supported freely, rotatably around the central position of the dome 204 as an axis of rotation by a shaft 226. The rear end and both side ends of the basal plate 220 are contacted with the inner curved surface of the dome and with the inner surface of the cover 212, respectively, and are slidable on these inner surfaces when the rear end of the moving plate 218 is moved along the inner circumference of the dome 204. The squeezing plate 222 is made of a rubbery plastic material and fixed to the basal plate 220 with the pressing plate 224. The front end of the squeezing plate 222 projects from the front end of the basal plate 220 and squeezes the lining material 46 passing through an opening between the front end of the squeezing plate 222 and the front end of the panel 216 to inhibit the forward movement of the binder 116 beyond the squeezing point when the moving plate is moved anticlockwise as shown in FIG. 8 or 9. The forward movement of the lining material 46 itself is not inhibited by the variable squeezing device 200 or 202. A locus of the upper and lower ends of the lining material 46 passing through the variable squeezing device 200 or 202 put in action is shown by the chain line in FIG. 9. If necessary, the angle of the moving plate 218 with the shelf plate 214 is limited by means of a stopper or the like. It is desirable to provide the variable squeezing device 200 or 202 with a precise angle-adjusting mechanism. The squeezing plate 222 is preferably allowed to project slightly also from the rear end and both side ends of the basal plate 220 so that the spaces between the moving plate 218 and the dome 204 and between the moving plate 218 and the cover 212 can air-tightly be sealed.

In the variable squeezing device 200 or 202, the shaft 226 extends outside the front drum 182 or the rear drum 184 of the pressure cylinder 76 and is driven externally, for example, by means of a rotary cylinder (not shown) commercially available under the name of "Highrotor" to move the moving plate 218 along the curved inner surface of the dome 204. An air pressure working circuit (not shown) is assembled to drive the rotary cylinder so that the first variable squeezing device 200 and the second variable squeezing device 202 may be operated alternately at given time intervals. This working circuit may be operated manually or automatically by detection of the amount of the binder 116 in the reservoir 118 and in the first and second advanced binder pools as will be described hereinafter.

The squeezing device 178 has substantially the same structure as shown in FIGS. 8 and 9 for the variable squeezing device 200 or 202. As the squeezing device 178 is used for adjusting the amount of the binder 116 to be applied onto the inner surface of the lining material 46 to a definite value, however, the use of a squeezing mechanism for squeezing the lining material 46 strongly with the elastic squeezing elements as in the variable squeezing devices 200 and 202 is not preferable for the squeezing device 178. Hence, the panel 216 made of a metal or a rigid plastic material is preferably used in the squeezing device 178. The squeezing device 178 is distinguished in function from the variable squeezing device 200 or 202 in the point that the degree of squeezing in the former device 178 is initially determined according to the desired purpose and is usually not varied throughout the operation to maintain the amount of the binder 116 to be applied at a definite value, whereas the degree of squeezing in the latter device 200 or 202 is occasionally varied during the operation for adjusting the amount of the binder to be conveyed to the reservoir 118. In the squeezing device 178, it is also preferable to provide it with a precise angle-adjusting mechanism actuated externally, for example, by means of a rotary cylinder outside the pressure cylinder 76. Once the operation has started, however, the squeezing device 178 is not driven externally during the operation. If simplification of the squeezing device is desired, a bulkhead provided with a mere slit of a definite size may be used in place of the bulkhead 58 and the squeezing device 178.

In FIG. 10 is shown a moving plate suitably used for the squeezing device 178. A moving plate 218' used in place of the moving plate 218 comprises a basal plate 220', a seal 226' made of a rubbery elastic material and a squeezing plate 228 fixed to the basal plate 220' through the seal 226' in such manner that the edge of the squeezing plate 228 may project from the front end of the basal plate 220'. The spaces between the moving plate 218' and the dome 204 and between the moving plate 218' and the cover 212 in the squeezing device 178 are always kept air-tight by the aid of the seal 226'. Thus, the moving plate 218' of the squeezing device 178 is previously moved anticlockwise to a predetermined position prior to construction of the pressurizing evagination device 10 so that the lining material can easily and smoothly be passed through the opening between the moving plate 218' and the shelf plate 214 of the squeezing device 178. During the operation, the squeezing device 178 involving the lining material 46 passing therethrough is kept air-tight so that the pressure container 12 is air-tightly separated from the pressure cylinder 76 to enable the formation of a pressure gradient between them at need by regulating the fluid pressure applied to the pressure container 12 and the pressure cylinder 76 separately by means of the valves 96 and 98.

In FIG. 11 is shown the variable squeezing device 200 or 202 relieved from the squeezing action. In this case, the moving plate 218 is rotated clockwise along the inner circumference of the dome 204 whereby the squeezing device 200 or 202 is kept in "open" position and the moving plate 218 is almost parallel to the lining material 46 passing through the variable squeezing device 200 or 202. A locus of the upper and lower ends of the lining material 46 passing through the device 200 or 202 in such "open" position is shown by a chain line. As is evident from comparison of FIG. 11 with FIG. 9, the lining material 46 passing through the variable squeezing device 200 or 202 set in "closed" position is squeezed as shown by the chain line in FIG. 9 while the lining material 46 passing through the variable squeezing device 200 or 202 set in "open" position is not squeezed as shown by the chain line in FIG. 11, thus enabling the forward movement of the binder 116 carried with the lining material 46.

When the variable squeezing device 200 or 202 is set in "open" position, air-tightness of the device 200 or 202 cannot be maintained. In the pressure cylinder 76, the first variable squeezing device 200 and the second variable squeezing device 202 are opened alternately to effect smooth advance movement of the binder 116 from the binder pool 298. Thus, it is usually not permitted to open both devices 200 and 202 at a time to avoid escaping all of the pressurized fluid from the pressure cylinder 76 through the variable squeezing devices 200 and 202.

In FIG. 12 and partly in FIG. 7(c) is shown the structure of the shut-off device 232 which is optional but desirable in the apparatus of this invention. The shut-off device 232 essentially comprises a cylinder having tapered portions 236 and 238 on both ends and an inlet 240 for pressurized fluid in the central side wall, urging rings 242 and 244, a flexible tube 246 and connecting pipes 248 and 250.

The flexible tube 246 is made of rubber or a soft plastic material or may be made of a flexible tubular material manufactured by reinforcing rubber or such plastic material with cloth. The rear connecting pipe 250 is connected to the discharge pipe 18 in front of the pressure container 12 while the front connecting pipe 248 is provided with an inlet 252 for pressurizing fluid and connected to the connecting assembly 260 through a flange means. The inlets 240 and 252 are connected to a compressor 330 through valves 320, 322 and 324 and pressure-regulating valves 326 and 328. This pressure circuit may be identical with or different from that for the pressurizing evagination device 10. The pressure system used for this device 232 may be common to that for the device 10. However, special effects of the shut-off device 232 are exerted remarkably when the pressure system for this device 232 is isolated from that for the device 10, because the shut-off device 232 can be used separately to achieve the before mentioned merits in case of any trouble in the device 10. In general, a compressor 330 may be smaller in size and capacity than that 100 used for the pressurized evagination device 10.

Even after completion of the lining treatment, the shut-off device 232 may be operated to achieve such additional advantages that the lining material 46 applied onto the inner surface of the pipe 32 can be maintained under pressure until the binder 116 interposed between the lining material 46 and the pipe 32 has been cured, that the main parts of the apparatus, i.e. the pressurizing evagination device 10 and the supply device 102 can be disjointed, transported and reconstructed for the treatment in other place while the shut-off device 232 is operated, and that consumption of electric power can be minimized by the use of the compressor 330 smaller in capacity than that 100 for the device 10.

On actual operations of the shut-off device 232, the tube 246 is allowed to penetrate through the inside of the cylinder 232 and both ends of the tube 246 are annularly fastened between the tapered portions 236 and 238 and the urging rings 242 and 244 air-tightly as shown in FIG. 7(c). When fluid pressure is applied to the tube 246 by sending pressurized fluid through the inlet 240, the space 254 between the tube 246 and the cylinder 234 is expanded as shown in FIG. 12 so that the tube is pushed inward by the external pressure and catches the lining material 46 running within the cylinder to inhibit the forward movement of the lining material 46 simultaneously with the shut-off action of the flow of pressurizing fluid from the device 10 to the turning point 120. The shut-off action of the device 232 can readily be lost by releasing the device from the pressure.

In FIGS. 13(a)–13(d) is shown the step-by-step procedure of the method of this invention for providing pipe lines with a lining material wherein the apparatus shown briefly in FIG. 6 and fully in FIGS. 7(a)–7(c) is used.

At the outset, the treatment begins with transportation of the platform cars 152 and 168 carrying the supply device 102 for the lining material 46 and the pressurizing evagination device 10, respectively, to the place where the treatment is to be carried out. The lining material 46 in flattened state is reeled off from the reel 106 and is then charged inside with a given amount of the binder 116 to form a binder pool 298. The portion of the lining material 46 where the binder pool 298 is formed is placed on the roller-conveyer 150 and thereafter the lining material 46 is again flattened and passed through the nipping device 162. The lining material 46 is introduced into the pressurizing evagination device 10 from the rear end of the pressure cylinder 76, passed through the second variable squeezing device 202, the rear drum 184, the first variable squeezing device 200, the front drum 182, the squeezing device 178 and the pressure container 12 where the lining material 46 is passed through the evagination velocity controlling assembly 104 and drawn out from the device 10 through the discharge pipe 18. In this case, the squeezing device 178 is squeezed just after passing the lining material 46 therethrough for dual purposes of adjusting the amount of the binder 116 applied onto the inner surface of the lining material 46 and forming the reservoir 118 for the binder 116 in rear of the squeezing device 178. It is necessary that the lining material 46 passed through the nipping device 162 carries the binder 116 in an amount at least equal to that carried by the lining material 46 passed through the squeezing device 178. The clearance between the rolls 166 in the nipping device 162 is previously adjusted to attain such effect. The lining material 46 is further passed through the connection device 230 and the front end thereof is evaginated and fixed to the annular fastener in the connecting assembly 20. If the induction pipe 256 is present in the connection device 230, the supply device 102 and the pressurizing evagination device 10 may be located in the position far from the working place where the treatment is carried out. For example, the devices 102 and 10 may be placed on the ground but the lining treatment itself may be carried out in the ground or on the roof of a high building. In case the lining treatment is carried out in the ground for treating gas pipe lines or the like, the size of the hole for the treatment may be small and the chiefly conducted on the ground. At this stage, the reservoir 118 alone is formed in rear of the squeezing device 178 and there is no necessity of forming advanced binder pools 302 and 304. In FIGS. 6 and 7(b), however, the variable squeezing devices 200 and 202 are in "closed" position and the formation of advanced binder pools 302 and 304 in rear of these devices are shown only for the purpose of better understanding of the functions of the individual devices.

On this condition, either one of the first and second variable squeezing devices 200 and 202 is closed and the other is opened. For example, the first variable squeezing device 200 is closed while the second variable squeezing device 202 is opened. Next, pressurized fluid is introduced through the inlet 74 and 88 into the pressure container 12 and the front drum 182 of the pressure cylinder 76 whereby the pressure container 12 and the front drum 182 is kept air-tight and at a desired fluid pressure because of the first variable squeezing device being closed. No problem will arise whether either one of the pressure container 12 and the front drum 182 is kept higher in pressure or both are kept equal in pressure. As in the method using the apparatus shown in FIG. 1, however, the binder 116 in the reservoir 118 can positively be sent through the squeezing device 178 to apply a sufficient amount of the binder 116 onto the inner surface of the lining material 46 by maintaining the pressure of the front drum 182 somewhat higher. It is also possible to adjust the amount of the binder 116 to be applied to the lining material 46 by regulating the fluid pressure in the front drum 182. Fluid pressure in the pressure container 12 is transmitted through the connection device 230 to act on the rear of the annularly fixed portion of the lining material 46 whereby the turning point 120 is formed there. The evagination velocity controlling assembly 104 is then driven to permit forward movement of the lining material 46 nipped between the caterpillar belts in the assembly 104 whereby the lining material 46 in flattened state is correspondingly reeled off from the reel 106 and conveyed to the pressurized evagination device 10 through the binder pool 298 and the nipping device 162. On the way to the device 10, the lining material is passed through the reservoir 118 and the squeezing device 178 whereby a given amount of the binder 116 is applied onto the inner surface of the lining material 46. In the device 10, the lining material 46 is conveyed forward by means of the evagination velocity controlling assembly 104 and passed through the connection device 230 and then through the spray device 288 where a lubricant is applied onto the external surface of the lining material 46. In the pipe 32, the lining material 46 to which the lubricant has been applied is passed through the inside of the already evaginated portion and supplied to the turning point 120 where the lining material 46 is turned inside out by the fluid pressure. The evaginated portion of the lining material 46 having the binder 116 on the outer surface thereof is attached under pressure onto the inner surface of the pipe 32 through the binder 116 and bonding of the lining material 46 to the pipe line 32 is finished when the binder 116 interposed therebetween is cured. This treatment is carried out continuously whereby the pipe 32 is provided over the full length thereof with the lining material 46.

In FIG. 13(a) showing the first stage of the method of this invention using the improved apparatus shown in FIG. 6 and in detail in FIGS. 7(a)–7(c), the binder 116 in the binder pool 298 is gradually carried forward with the advance movement of the lining material 46. The binder 116 is squeezed in the first variable squeezing device 200 whereby the first advance binder pool 302 is formed in rear of the device 200. On the other hand, the binder 116 in the reservoir 118 is gradually consumed as the binder 116 is carried away with the advancing lining material 46.

In FIG. 13(b) showing the second stage of the method of this invention using the improved apparatus, the second variable squeezing device 202 is closed when the consumption of the binder 116 in the reservoir 118 reaches a certain degree. The second advanced binder pool 304 is formed at this stage in rear of the second variable squeezing device 202.

In FIG. 13(c) showing the third stage of the method, the first variable squeezing device 200 is opened whereby the fluid pressure in the pressure cylinder 76 is maintained as the second variable squeezing device 202 is closed. As the binder 116 supplied from the binder pool 298 is squeezed in the second variable squeezing device 202, the amount of the binder 116 in the second advanced binder pool 304 in rear of the device 202 is increased. On the other hand, all of the binder 116 in the first advanced binder pool 302 is carried forward with the advancing lining material 46 through the opened first variable squeezing device 300 and absorbed in the reservoir 118. The binder 116 in the reservoir 118 is supplied in this manner.

In FIG. 13(d) showing the fourth stage of the method, the first variable squeezing device 200 is closed. At this stage, the amount of the binder accumulated in the second advanced binder pool 304 becomes maximum. By opening the second variable squeezing device 202, all of the binder 116 in the second advanced binder pool 304 is carried forward with the advancing lining material 46 through the opened device 202 and squeezed in the closed first variable squeezing device 200 whereby the first advanced binder pool 302 is formed in rear of the device 200 as shown in FIG. 3(a).

By repeating this procedure, the binder 116 in the binder pool 298 is gradually carried forward and supplied to the reservoir 118 through the second advanced binder pool 304 and the first advanced binder pool 302.

In the foregoing procedure, it is not necessary that the first or second variable squeezing device 200 or 202 so tightly closed such that the forward movement of the binder 116 in the first or second advanced binder pool 302 or 304 is perfectly inhibited. When the first or second variable squeezing device 200 or 202 is closed, the pressure of the space in front of the variable squeezing device is kept higher than that of the space in rear of the device. Thus, it is rather rare that the binder 116 is carried forward beyond the variable squeezing device 200 or 202 when the device is closed.

When the forward movement of the lining material 46 is continued and all of the lining material 46 is reeled off from the reel 106, a belt or rope 114 is successively reeled off. At this stage, almost all of the binder 116 in the reservoir 118, the advanced binder pools 302 and 304 and the binder pool 298 is consumed but the remaining slightly excess binder 116 is discarded into the pressure cylinder 76 or outside the rear end thereof through the open rear end of the lining material 46. The excess binder 116 is recovered or removed after completion of the lining treatment. After passing the lining material 46 through the pressurizing evagination device 10, the belt or rope 114 is successively passed therethrough. Even after the lining material has been passed through the device 10, the subsequent belt or rope 114 is nipped between the caterpiller belts in the evagination velocity controlling assembly 104 and is carried forward at a definite velocity so that the evagination velocity of the lining material 46 in the pipe 32 is normally controlled to prevent occurrence of any rapid evagination of the lining material 46.

After evagination of the lining material 46 is finished over the full length of the pipe 32, the fluid pressure in the evaginated lining material is continuously maintained until the binder is completely cured to effect bonding of the lining material 46 onto the inner surface of the pipe 32. When the apparatus is provided with the shut-off device 232 as shown in FIG. 7(c), fluid pressure is applied to the connection device 230 through the inlet 252 and higher fluid pressure is separately applied to the shut-off device 232 through the inlet 240 whereby the tube 246 is expanded inward to shut off the path communicated with the pressurizing evagination device 10. By doing so, the fluid pressure in the pressure container 12 no longer acts on the evaginated lining material 46 in the pipe 32. Accordingly, the pressurizing evagination device 10 and the supply device 102 can be disjointed at this stage and cleaning of these devices or any aftertreatment may be done. Alternatively, the platform cars carrying the devices 10 and 102 may be removed to the location where another lining treatment of pipe lines is to be carried out while the shut-off device 232 is operated until the binder 116 has been cured. In case a liquid resin curable by heating is used as the binder 116, a hot blast or superheated steam may be introduced under pressure through the inlet 252 to effect curing of the binder 116. After the binder 116 has been cured completely to bond the lining material 46 onto the inner surface of the pipe 32, the end of the lining material 46 is unfastened from the connecting assembly 20 and both ends of the lining material 46 are properly treated, for example, by cutting off the marginal ends to finish the lining treatment.

As compared with the embodiment using the apparatus shown in FIG. 1, the embodiment using the apparatus shown in FIG. 6 (in detail in FIGS. 7a, 7b and 7c) is particularly advantageous in the lining treatment of already constructed pipe lines without necessity of moving or disjointing them. In the embodiment using the apparatus shown in FIG. 1, the reservoir 118 for the binder 116 is formed in the pressure cylinder 76. If the lining treatment is carried out according to this embodiment for extremely long pipe lines, a considerably larger amount of the binder 116 is required so that the reservoir 118 becomes very large correspondingly. Thus, the capacity of the pressure cylinder 76 should be large enough to accommodate such large reservoir 118. For instance, the quantity of a binder 116 necessary for the lining treatment is about 250 liters, provided that the inner diameter and length of a pipe line 32 to be treated are 150 mm and 500 m, respectively, and an average thickness of the binder 116 to be interposed between the inner surface of the pipe line 32 and the lining material 46 is 1 mm. If about 250 liters of the binder 116 is enclosed in the lining material 46 having an inner diameter of 150 mm, the length of a reservoir 118 for the binder 116 is as long as about 14 m. It follows that the length of the pressure cylinder 76 should be at least 15 m. If the pipe line becomes longer, the capacity of the pressure cylinder 76 will naturally be large enough to accommodate the increased amount of binder 116. In addition to the necessity of an enormous pressure cylinder, trouble also occurs in regulation of fluid pressure; as the binder in a large reservoir is consumed, the space in the pressure cylinder 76 is increased so that regulation of the fluid pressure becomes necessary for smooth application of the binder 116 to the lining material 46.

In contrast, the embodiment using the apparatus shown in FIG. 6 (in detail, in FIGS. 7a, 7b and 7c) wherein the binder pool 298 containing a substantial part of the binder 116 required for the lining treatment may be present outside the pressurizing evagination device 10, the size of the device 10 may be small and the same compact evagination device 10 may be used irrespective of whether the amount of the binder 116 is large or small. As the amount of the binder 116 accumulated in the reservoir 118 is not fluctuated, the amount of the binder 116 applied onto the inner surface of the lining material 46 by means of the squeezing device 178 becomes definite and is not fluctuated significantly.

FIGS. 14(a)-14(d) show another embodiment of the method of this invention using a modified model of the apparatus shown in FIG. 6 (FIGS. 7a, 7b and 7c in detail), wherein the binder pool 298 is formed just in rear of the second variable squeezing device 202 by omitting the nipping device 162 or making modifications thereto.

In FIG. 14(a) showing the first stage of this embodiment, the second variable squeezing device 202 is opened so that the binder pool 298 is extended to the rear drum 184 beyond the device 202 and integrally combined with the advanced binder pool 302.

In FIG. 14(b) showing the second stage of this embodiment, the second variable squeezing device 202 is closed so that the binder pool 298 extending to the rear drum 184 is separated at the rear end of the pressure cylinder 76 wherein the binder 116 in the rear drum 184 forms the advanced binder pool 302. At this stage, the binder 116 in the reservoir 118 is gradually consumed as the binder 116 is carried away with the advancing lining material 46 through the front drum 182.

In FIG. 14(c) showing the third stage of this embodiment, the first variable squeezing device 200 is opened whereby all of the binder in the advanced binder pool 302 is carried forward with the advancing lining material 46 through the device 200 and absorbed in the reservoir 118 in the front drum 182.

In FIG. 14(d) showing the fourth stage of this embodiment, the first variable squeezing device 200 is closed. Next, the second variable squeezing device 202 is opened whereby the binder 116 in the binder pool 298 is carried forward with the advancing lining material 46 and forms in the rear drum 184 the advanced binder pool 302 which is communicated with the binder pool 298 through the device 202 as shown in FIG. 14(a).

By repeating this procedure, the binder 116 in the binder pool 298 is gradually carried forward and supplied to the reservoir 118 with the advancing lining material 46, as in the case shown in FIGS. 13(a)-13(d).

FIGS. 15(a)-15(d) show still another embodiment of the method of this invention using a modified model of the apparatus shown in FIG. 6 (FIGS. 7a, 7b and 7c in detail), wherein the binder pool 298 is formed just behind the second variable squeezing device 202, as in the case shown in FIGS. 14(a)-14(d).

In FIG. 15(a) showing the first stage of this embodiment, the second variable squeezing device 202 is slightly opened to introduce the binder 116 in the binder pool 298 into the rear drum 184 whereby the advanced binder pool 302 is formed in rear of the first variable squeezing device 200.

In FIG. 15(b) showing the second stage of this embodiment, the binder 116 in the advanced binder pool 302 is increased to a given amount and the second variable squeezing device 202 is closed at this stage. On the other hand, the binder 116 in the reservoir 118 is gradually consumed as the binder 116 is carried away with the advanced lining material 46.

In FIG. 15(c) showing the third stage of this embodiment, the first variable squeezing device 200 is opened to permit advance of the binder 116 in the advanced binder pool 302 whereby the advanced binder 116 is integrally combined with the binder in the reservoir 118.

In FIG. 15(d) showing the fourth stage of this embodiment, the first variable squeezing device 200 is closed when all of the binder 116 in the advanced binder pool 202 is carried forward. Next, the second variable squeezing device 202 is slightly opened to introduce the binder 116 in the binder pool 298 into the rear drum as shown in FIG. 15(a).

By repeating this procedure, the binder 116 in the binder pool 298 can be carried forward gradually to refill the reservoir 118 as in the case shown in FIGS. 13(a)-13(d).

As a variant of this embodiment, a given amount of the binder 116 may be enclosed in the lining material 46 over its full length instead of forming the binder pool 298 containing a large amount of the binder 116 in only one portion of the lining material 46 as shown in FIGS. 6 and 7(a). In this case, it is not necessary that the binder 116 enclosed in the lining material 46 over its full length has been distributed evenly over all the inner surface of the lining material 46. Even if the binder 116 has unevenly been applied onto the inner surface of the lining material 46, the binder 116 applied becomes even when the lining material 46 is passed through the advanced binder pools 302 and 304 and the reservoir 118. As another variant of this embodiment, a given amount of the binder 116 may be enclosed in portions in the lining material 46 at definite intervals to form a plurality of small binder pools instead of forming only one large binder pool 298 in the lining material 46.

FIGS. 16(a) and 16(b) are diagrams schematically showing a further embodiment of the method of this invention using another modified model of the apparatus shown in FIG. 6 (FIGS. 7a, 7b and 7c in detail), wherein an inlet 306 for pressurized fluid and an outlet 308 for pressurized fluid are fitted to the rear drum 184 in the pressure cylinder 76, in addition to the inlet 74 in the pressure container 12 and the inlet 88 in the front drum 182 and wherein the bulkhead 58 is provided with a slit 62 in place of the squeezing device 178 and the pressure cylinder 76 is provided on the partition walls 188 and 190 with slits 310 and 312 in place of the variable squeezing devices 200 and 202, respectively. In this modified model, it is desirable that the slits 310 and 312 are longer in width than the slit 62. The lining material 46 passing through the binder pool 298 and the nipping device 162 is introduced into the pressurizing evagination device 10 through the slit 312 and is passed in the device 10 through the slits 310 and 62. The structure of this modified model is identical in other respects with that of the apparatus shown in FIG. 6. In this embodiment, the step for introducing pressurized fluid into the rear drum 184 through the inlet 306 and the step for exhausting the pressurized fluid from the rear drum 184 through the outlet 308 to maintain the rear drum at atmospheric pressure are carried out alternately while introducing pressurized fluid into the pressure container 12 and the front drum 182 through the inlets 74 and 88, respectively, as in the aforesaid embodiments.

In FIG. 16(a) showing the first stage of this embodiment, pressurized fluid is introduced into the pressure container 12 and the front drum 182 through the inlets 74 and 88, respectively, while exhausting pressurized fluid from the rear drum 184 through the outlet 308 to maintain the rear drum 184 at atmospheric pressure. The binder 116 carried away from the binder pool 298 by the advancing lining material 46 can easily be introduced into the rear drum 184 through the slit 312 since the drum 184 is maintained at atmospheric pressure. However, as the front drum 182 is kept under pressure, the lining material 46 is squeezed in the slit 310 whereby the binder 116 cannot be passed through the slit 310 and a first advanced binder pool 302 is thus formed in rear of the slit 310. If the air in the rear drum 184 is evacuated to keep it under subatmospheric pressure, the introduction of the binder 116 into the rear drum 184 through the slit 312 will be accelerated.

In FIG. 16(b) showing the second stage of this embodiment, the outlet 308 is closed and pressurized fluid is introduced into the rear drum 184 through the inlet 306 whereby the lining material 46 is squeezed in the slit 312 to inhibit the forward movement of the binder 116. Thus, a second advanced binder pool 304 is formed in rear of the slit 312. On the other hand, the squeezing action on the lining material 46 in the slit 310 is lost by pressurizing the rear drum 184 with the fluid whereby the binder 116 in the first advanced binder pool 302 is carried forward through the slit 310 and absorbed in the reservoir 118. If the pressure in the rear drum 184 is kept higher than that in the front drum 182, the movement of the binder 116 from the first advanced binder pool 302 to the reservoir 118 will be accelerated.

When the fluid pressure is again exhausted from the rear drum 184 through the outlet 308 to maintain the rear drum 184 at atmospheric pressure, the binder 116 in the second advanced binder pool 304 is introduced into the rear drum 184 through the slit 312 and absorbed in the first advanced binder pool 302. However, the movement of the binder 116 from the binder pool 302 to the reservoir 118 is inhibited as shown in FIG. 16(a). By repeating this procedure, the binder 116 in the binder pool 298 can gradually be carried forward and supplied to the reservoir 118.

In this embodiment, it is of course possible to provide the partition wall 188 with the inlet 306 for pressurized fluid so as to supply the pressurized fluid in the front drum 182 to the rear drum 184. It is also possible to mount a seal to the slit 310 or 312 so that when a difference in pressure is formed between the space in front of the slit and the space in rear of the slit, the lining material 46 may be squeezed to inhibit the forward movement of the binder 116 and at the same time any leakage of the pressurized fluid may be prevented. For achieving the same purpose, pivotally connected moving plates which can be actuated by the fluid pressure in the front drum 182 and the rear drum 194 may be mounted in front of the slits 310 and 312, respectively.

In contrast to the foregoing various embodiments wherein fluid pressure acting on the rear of the turning point 120 is used, an alternative embodiment wherein the interior space of the pipe line in front of the turning point 120 is kept under reduced pressure can be used in the method of this invention to effect evagination of the lining material followed by bonding it to the inner surface of the pipe line 32. In this case, the pressure container 12 in the pressurizing evagination device 10 is unnecessary but the pressure cylinder 76 may be used for pressurizing the reservoir 118 to adjust the amount of the binder 116 to be applied to the inner surface of the lining material.

It is also possible to use the embodiment wherein the fluid pressure is used for evagination of the lining material jointly with the embodiment wherein reduced pressure is applied to the interior space of the pipe line for evagination of the lining material. The conjoint use of these embodiments is based on the fact that the evagination of the lining material at the turning point takes place when a difference in pressure is formed between the space in front of the turning point and the space in rear thereof.

Furthermore, the following modification may be made in the method of this invention for evagination of the lining material. According to this modification, a belt or rope is previously passed through the lining material over its full length and drawn from the opposite end of the pipe 32 while applying fluid pressure to the lining material in rear of the annularly fastened portion whereby the unevaginated portion of the lining material is allowed to advance within the pipe 32 and evaginated at the turning point 120 and at the same time the evaginated lining material is attached onto the inner surface of the pipe under pressure of the pressurized fluid. In the method utilizing this modification, the fluid pressure may be so weak that the already evagination portion of the lining material may be attached under pressure onto the inner surface of the pipe. In other words, no strong force is required for the fluid pressure for allowing the lining material to advance within the pipe. Moreover, there is no fear of fluctuation in fluid pressure on condition of the pipe lines. According to this modification, therefore, bonding of the lining material to the pipe line can be carried out in a more certain manner.

The use of the belt or rope 114 is not absolutely necessary in the foregoing various embodiments but is of particular advantage in that the evagination velocity of the lining material can be controlled over the full length of the pipe line, for example, even after the rear end of the lining material has passed through the evagination velocity controlling assembly 104.

It is a matter of course that the method and apparatus of the present invention are not limited to the uses for repairing or reinforcing the pipe lines already constructed by providing them with a lining material, but is also utilizable for previously providing new pipe lines with a lining material or for the production of steel pipes having a lining on their inner surface. Further, the method of the present invention can be applied to protective pipes for power-transmission wires and telephone cables as well as conduit pipes for water, gas, air-conditioning media and sewer in buildings or the like constructions for preventing any electric leakage or any leakage of a gaseous or liquid substance from the pipe lines.

The method and apparatus of the present invention relate not only to providing pipe lines with a flexible tubular textile or plastic lining material through a binder but also to application of a liquid resin as binder alone onto the inner surface of pipe lines. For example, it is not necessary to bond such tubular lining material 32 onto the inner surface of pipe lines through a liquid resin as binder. In some cases, such tubular lining material 46 is once applied according to the method of this invention onto the inner surface of the pipe line 32 through a liquid resin under pressure and thereafter the lining material 46 may be peeled off and removed from the pipe line 32 by drawing the belt or rope 114 connected to the lining material 46 toward the pressure container 12 while turning the lining material outside in whereby the liquid resin is retained evenly on the inner surface of the pipe lines 32. When the liquid resin is dried or cured, a film of the resin will be retained as a lining on the inner surface of the pipe lines. As a variant of this embodiment, it is also possible to apply the tubular lining material 46 onto the inner surface of the pipe lines 32 according to the two-step method by first applying the liquid resin alone in the manner just above described and then applying, before curing of the liquid resin, the tubular lining material alone or together with another liquid resin onto the liquid resin-applied inner surface of the pipe line according to any one of the embodiments of the present invention. As another variant of this embodiment, one component of a two-component binder such as an epoxy binder is first applied onto the inner surface of the pipe line and thereafter the other component is applied to bring both components into contact with each other for reaction to form a coating of the resin as a lining on the inner surface of the pipe lines. In this case, a filler such as a fibrous reinforcing material may be incorporated into either or both of the components. Further, it is possible to apply a lining material carrying one embodiment of a two-component binder onto the layer of the other component already formed on the inner surface of the pipe lines. As still another variant of this embodiment, plural coats of resins such as a combination of a rigid plastic coat and an elastic soft plastic coat may be applied onto the inner surface of the pipe lines according to the above mentioned lining method.

It is also a merit of this invention that these embodiments can be carried out without any particular attention being paid to the pot life of the binder used.

As many apparently widely different embodiments of this invention may be made without departing from the spirit and scope thereof, it is to be construed that this invention is not limited to the specific embodiments thereof except as defined in the appended claims.

What is claimed is:

1. A method for providing the inner surface of a pipe with a flexible tubular lining material through a liquid resin under pressure which comprises annularly fixing one end of a flexible tubular lining material, applying fluid pressure to th rear of the annularly fixed position of said flexible tubular lining material, turning said tubular lining material inside out at a turning point formed in rear of said fixed position while allowing said turning point to advance within a pipe and attaching the evaginated tubular lining material onto the inner surface of said pipe under said fluid pressure, characterized by forming a reservoir of a liquid resin enclosed in the interior of the unevaginated portion of said tubular lining material in rear of said annularly fixed portion while applying external fluid pressure to the portions of said tubular lining material where said reservoir is formed, passing said tubular lining material through said reservoir to apply said liquid resin onto the inner surface of said tubular lining material, squeezing said tubular lining material to adjust the amount of said liquid resin applied, supplying said tubular lining material to said turning point where said tubular lining material is evaginated and attaching the evaginated tubular lining material under said fluid pressure onto the inner surface of said pipe through said liquid resin wherein (A) a step for forming a liquid resin pool containing a substantial part of said liquid resin in the interior portion of said tubular lining material in rear of said reservoir and inhibiting, in a first position between said reservoir and said liquid resin pool, the forward movement toward said reservoir of said liquid resin attached to the inner surface of said tubular lining material passing through said liquid resin pool while forming a first advanced liquid resin pool in rear of said first position and (B) another step for inhibiting, in a second position between said first position and said liquid resin pool, the forward movement toward said first position of said liquid resin attached to the inner surface of said tubular lining material passing through said liquid resin pool while allowing said liquid resin in said first advanced liquid resin pool to advance to said reservoir, are repeated to supply said liquid resin in said liquid resin pool intermittently to said reservoir.

2. A method according to claim 1 wherein said tubular lining material is squeezed externally so as to be flattened in said first position and in said second position to inhibit the forward movement of said liquid resin and is relieved from said squeezing to allow said liquid resin to advance.

3. A method according to claim 1 wherein said liquid resin pool is located in rear of said second position and said liquid resin is gradually supplied from said liquid resin pool to said first or second position in such manner that when the forward movement of said liquid resin is inhibited in said second position, a second advanced liquid resin pool is formed just in rear of said second position.

4. A method according to claim 3 wherein the amount of said liquid resin supplied from said liquid resin pool to said first and second position is not smaller than the amount of said liquid resin applied onto the inner surface of said tubular lining material.

5. A method according to claim 1 wherein a second advanced liquid resin pool is formed just in rear of said second position.

6. A method according to claim 5 wherein the forward movement of said liquid resin is permitted in said second position and said liquid resin in said liquid resin pool is gradually carried toward said first position.

7. A method according to claim 6 wherein the forward movement of said liquid resin from said liquid resin pool to said first advanced liquid resin pool is inhibited in said second position after the amount of said liquid resin in said first advanced liquid resin pool has reached a given value.

8. A method according to claim 5 wherein said liquid resin pool is allowed to advance toward said first position through said second position by permitting passage of said liquid resin in said second position, and said liquid resin pool is pressurized in said second position to separate said first advanced liquid resin pool from said liquid resin pool while inhibiting passage of said liquid resin in said liquid resin pool beyond said second position.

9. A method according to claim 1 wherein said tubular lining material in flattened state is passed through slits formed in said first and second positions and the ambient fluid pressure to said tubular lining material between said first position and said second position is kept lower than the ambient fluid pressure to the portion of said tubular lining material where said reservoir is formed and almost equal to or lower than the ambient fluid pressure to said tubular lining material in rear of said second position whereby passage of said liquid resin through said second position is permitted but passage of said liquid resin through said first position is inhibited and wherein the ambient fluid pressure to said tubular lining material between said first position and said second position is kept almost equal to or higher than the ambient fluid pressure to the portion of said tubular lining material where said reservoir is formed and also higher than the ambient pressure to said tubular lining material in rear of said second position whereby passage of said liquid resin through said second position is inhibited but passage of said liquid resin through said first position is permitted.

10. A method according to claim 1 wherein said liquid resin in said advanced liquid resin pool is carried toward said reservoir when the amount of said liquid resin in such reservoir becomes smaller than a given value.

11. A method according to claim 1 wherein said liquid resin pool is formed by enclosing said liquid resin in said tubular lining material in rear of said first position over its full length.

12. A method according to claim 1 wherein said liquid resin pool is a plurality of small liquid resin pools formed at definite intervals in said tubular lining material in rear of said first position.

13. A method for providing the inner surface of a pipe with a flexible tubular lining material through a liquid resin under pressure which comprises annularly fixing one end of a flexible tubular lining material, applying fluid pressure to the rear of the annularly fixed position of said flexible tubular lining material, turning said tubular lining material inside out at a turning point formed in rer of said fixed position while allowing said turning point to advance within a pipe and attaching the evaginated tubular lining material onto the inner surface of said pipe under said fluid pressure, characterized by forming a reservoir of a liquid resin enclosed in the interior of the unevaginated portion of said tubular lining material in rear of said annularly fixed portion while applying external fluid pressure to the portion of said tubular lining material where said reservoir is formed, passing said tubular lining material through said reservoir to apply said liquid resin onto the inner surface of said tubular lining material, squeezing said tubular lining material to adjust the amount of said liquid resin applied, supplying said tubular lining material to said turning point where said tubular lining material is evaginated and attaching the evaginated tubular lining material under said fluid pressure onto the inner surface of said pipe through said liquid resin wherein the amount of said liquid resin applied onto the inner surface of said tubular lining material is adjusted by regulating the fluid pressure applied externally to the portion of said tubular lining material where said reservoir is formed in relation to the fluid pressure applied to the portion of said tubular lining material in rear of said turning point.

* * * * *

UNITED STATES PATENT AND TRADEMARK OFFICE
CERTIFICATE OF CORRECTION

PATENT NO. : 4,368,091

DATED : January 11, 1983

INVENTOR(S) : Akio Morinaga and Akira Morita

It is certified that error appears in the above—identified patent and that said Letters Patent is hereby corrected as shown below:

On the title page:

In the category "[75] Inventors", change "Hisao Ontsuga, Tokyo; Akio Morinaga, Fujisawa; Akira Morita, Osaka, all of Japan" to -- Akio Morinaga, Fujisawa; Akira Morita, Osaka, both of Japan --

Signed and Sealed this

Fourteenth Day of June 1983

[SEAL]

Attest:

DONALD J. QUIGG

Attesting Officer

Acting Commissioner of Patents and Trademarks